US012654502B2

(12) United States Patent
Yu et al.

(10) Patent No.: US 12,654,502 B2
(45) Date of Patent: Jun. 16, 2026

(54) AIR SUSPENSION SYSTEM

(71) Applicant: Jilin Weichuang Electromechanical Engineering Co., Ltd., Changchun (CN)

(72) Inventors: Jilong Yu, Changchun (CN); Ruiyuan Tian, Changchun (CN); Hongfei Xiao, Changchun (CN); Hongyu Zhu, Changchun (CN); Zilong Chen, Changchun (CN); Qi Yu, Changchun (CN)

(73) Assignee: Jilin Weichuang Electromechanical Engineering Co., Ltd., Changchun (CN)

( * ) Notice: Subject to any disclaimer, the term of this patent is extended or adjusted under 35 U.S.C. 154(b) by 0 days.

(21) Appl. No.: 18/822,514

(22) Filed: Sep. 3, 2024

(65) Prior Publication Data

US 2025/0128557 A1 Apr. 24, 2025

(30) Foreign Application Priority Data

Oct. 19, 2023 (CN) .......................... 202311352112.9
Mar. 20, 2024 (CN) .......................... 202420542179.2
(Continued)

(51) Int. Cl.
*B60G 9/02* (2006.01)
*B60B 35/16* (2006.01)
(Continued)

(52) U.S. Cl.
CPC ................ *B60G 9/02* (2013.01); *B60B 35/16* (2013.01); *B60G 5/04* (2013.01); *B60G 15/12* (2013.01);
(Continued)

(58) Field of Classification Search
CPC ........ B60G 9/02; B60G 5/04; B60G 2200/31; B60G 2200/326; B60G 9/003; B60B 35/007
See application file for complete search history.

(56) References Cited

U.S. PATENT DOCUMENTS 4,309,045 A * 1/1982 Raidel ...................... B60G 7/00
                                              280/124.116
6,808,192 B1 * 10/2004 Bol ........................ B60G 9/003
                                              280/124.116
(Continued)

FOREIGN PATENT DOCUMENTS

CA        2759808 C * 9/2016 ............. B60G 9/022
CN     201304876 Y    9/2009
(Continued)

OTHER PUBLICATIONS

Computer generated English translation of CA 2759808 (Year: 2025).*
(Continued)

*Primary Examiner* — Paul N Dickson
*Assistant Examiner* — Tiffany L Webb

(57) ABSTRACT

The present application discloses an air suspension system, including a frame for mounting a vehicle body, a bridge housing for mounting wheels, and air springs, shock absorbers, a connecting rod frame and a thrust module connected between the frame and the bridge housing. Since the thrust module is standardized, a suitable thrust module can be matched according to different working conditions, thereby making the complex suspension adjustment work lightweight.

12 Claims, 17 Drawing Sheets

100

(30)        Foreign Application Priority Data

Aug. 7, 2024    (CN) ......................... 202411080349.0
Aug. 7, 2024    (CN) ......................... 202421904967.8

(51) Int. Cl.
  *B60G 5/04*            (2006.01)
  *B60G 15/12*           (2006.01)
(52) U.S. Cl.
  CPC ...  *B60B 2310/202* (2013.01); *B60B 2900/115*
      (2013.01); *B60G 2200/31* (2013.01); *B60G*
      *2200/326* (2013.01); *B60G 2202/30* (2013.01);
      *B60G 2204/143* (2013.01); *B60G 2206/10*
      (2013.01)

(56)           References Cited

U.S. PATENT DOCUMENTS 7,766,352  B2 *   8/2010  Keeler ................... B60G 7/001
                                         280/124.106

8,770,604  B2 *   7/2014  Brereton ................ B60G 7/001
                                         280/124.108
8,844,956  B2 *   9/2014  Boler ................... B60G 13/003
                                         280/124.116
9,010,782  B2 *   4/2015  Kiselis ..................... B60G 5/00
                                         280/124.106
2006/0255557  A1 *  11/2006  Hass ...................... B60G 11/27
                                         280/124.157

FOREIGN PATENT DOCUMENTS

CN        107848356  B   * 10/2020   ............ B60G 9/022
CN        111791659  A    10/2020
CN        113635723  A    11/2021

OTHER PUBLICATIONS

Computer generated English translation of CN 107848356 (Year: 2025).*

* cited by examiner

121

1211

1214

1212

1213

1213

1212

100

1637
1638
1635
1636
1631
1632
1633
1634

112 1531 132 1221 162 134
161 133 143
131 1551
1213
1203
1212
121 1532 155 1222 122 1224

AIR SUSPENSION SYSTEM

CROSS-REFERENCE TO RELATED APPLICATION

The present application claims priority to Chinese Patent Application No. 202311352112.9, filed on Oct. 19, 2023, the content of which is incorporated herein by reference in its entirety.

The present application claims priority to Chinese Patent Application No. 202420542179.2, filed on Mar. 20, 2024, the content of which is incorporated herein by reference in its entirety.

The present application claims priority to Chinese Patent Application No. 202411080349.0, filed on Aug. 7, 2024, the content of which is incorporated herein by reference in its entirety.

The present application claims priority to Chinese Patent Application No. 202421904967.8, filed on Aug. 7, 2024, the content of which is incorporated herein by reference in its entirety.

FIELD

The present disclosure relates to the field of automobile technology, and in particular to an air suspension system.

BACKGROUND

The air suspension system in the prior art includes a frame for mounting a vehicle body, a bridge housing for mounting wheels, and an air spring and a shock absorber connected between the frame and the bridge housing.

In the process of realizing the prior art, the inventor found:

The ride comfort of a vehicle is closely related to the tuning of the air suspension system. Specifically, the quality of tuning of air suspension system is closely related to the stability, anti-rolling, braking ability, handling, and impact resistance of the vehicle. The tuning of the air suspension system is a system engineering with a huge workload, which is very dependent on the tuning experience of the corresponding operator.

Therefore, it is necessary to provide a technical solution to the complex problem of tuning process of the air suspension system.

SUMMARY

The purpose of the present application is to provide an air suspension system to solve the technical problem of complex air suspension system adjustment process.

To achieve the above-mentioned purpose, the present application provides an air suspension system, including a frame for mounting a vehicle body, a bridge housing for mounting wheels, and air springs, shock absorbers, a connecting rod frame and a thrust module connected between the frame and the bridge housing;

the frame includes a frame longitudinal beam;

the bridge housing includes a drive bridge housing;

the drive bridge housing includes a bridge housing body, half-axle sleeves located on both sides of the bridge housing body, and a first support arm extending from the half-axle sleeves along the periphery of the half-axle sleeves in a first direction and a first longitudinal push arm extending from the half-axle sleeves along the periphery of the half-axle sleeves in a second direction away from the first direction;

the connecting rod frame includes a first connecting rod frame;

one end of the first connecting rod frame is connected to the frame longitudinal beam, and the other end is pivotally connected to the first longitudinal push arm;

the shock absorbers include a first shock absorber;

one end of the first shock absorber is connected to the frame longitudinal beam, and the other end is connected to the first longitudinal push arm;

the air springs include a first air spring distributed in the first longitudinal position;

one side of the first air spring is installed on the first support arm, and the other side is installed on the frame longitudinal beam;

the thrust module has a type identification feature that characterizes the performance, and the type identification feature of the thrust module matches the suspension performance requirements of the vehicle;

the thrust module includes a first thrust module;

one side of the first thrust module is connected to the bridge housing body, and the other side is horizontally and vertically connected to the frame longitudinal beam.

The present application also provides an air suspension system, including a frame for mounting a vehicle body, a bridge housing for mounting wheels, and air springs, shock absorbers, a connecting rod frame and a thrust module connected between the frame and the bridge housing;

the frame includes a frame longitudinal beam and a frame crossbeam transversely connecting the frame longitudinal beam;

the bridge housing includes a drive bridge housing;

the drive bridge housing includes a bridge housing body, half-axle sleeves located on both sides of the bridge housing body, and a first support arm extending from the half-axle sleeves along the periphery of the half-axle sleeves in a first direction and a first longitudinal push arm extending from the half-axle sleeves along the periphery of the half-axle sleeves in a second direction away from the first direction;

the connecting rod frame includes a first connecting rod frame;

one end of the first connecting rod frame is connected to the frame longitudinal beam, and the other end is pivotally connected to the first longitudinal push arm;

the shock absorbers include a first shock absorber;

one end of the first shock absorber is connected to the frame longitudinal beam, and the other end is connected to the first longitudinal push arm;

the air springs include a first air spring distributed in the first longitudinal position;

one side of the first air spring is installed on the first support arm, and the other side is installed on the frame longitudinal beam;

the thrust module has a type identification feature that characterizes the performance, and the type identification feature of the thrust module matches the suspension performance requirements of the vehicle;

the thrust module includes a first thrust module;

one side of the first thrust module is connected to the bridge housing body, and the other side is connected to the frame crossbeam.

The present application also provides an air suspension system, including a frame for mounting a vehicle body, a bridge housing for mounting wheels, and air springs, shock absorbers, and a connecting rod frame connected between the frame and the bridge housing;

the frame includes a frame longitudinal beam;

the bridge housing includes a drive bridge housing;

the drive bridge housing includes a bridge housing body, half-axle sleeves located on both sides of the bridge housing body, and a first support arm extending from the half-axle sleeves along the periphery of the half-axle sleeves in a first direction and a first longitudinal push arm extending from the half-axle sleeves along the periphery of the half-axle sleeves in a second direction away from the first direction;

the connecting rod frame includes a first connecting rod frame;

one end of the first connecting rod frame is connected to the frame longitudinal beam, and the other end is pivotally connected to the first longitudinal push arm;

the shock absorbers include a first shock absorber;

one end of the first shock absorber is connected to the frame longitudinal beam, and the other end is connected to the first longitudinal push arm;

the air springs include a first air spring distributed in the first longitudinal position;

one side of the first air spring is installed on the first support arm, and the other side is installed on the frame longitudinal beam;

the first connecting rod frame extends a fork-shaped arm from the frame longitudinal beam;

a cylindrical arm support is provided at the end of the first longitudinal push arm;

the first connecting rod frame also includes an arm shaft;

the cylindrical arm support is embedded in the fork-shaped arm, and the arm shaft passes through the cylindrical arm support and is inserted into the fork-shaped arm.

The present application also provides an air suspension system, including a frame for mounting a vehicle body, a bridge housing for mounting wheels, and air springs, shock absorbers, a connecting rod frame and a thrust module connected between the frame and the bridge housing;

the frame includes a frame longitudinal beam and a frame crossbeam transversely connecting the frame longitudinal beam;

the bridge housing includes a drive bridge housing;

the drive bridge housing includes a bridge housing body, half-axle sleeves located on both sides of the bridge housing body, and a first bracket extending from the half-axle sleeves along the periphery of the half-axle sleeves in a first direction and a third bracket extending from the half-axle sleeves along the periphery of the half-axle sleeves in a second direction away from the first direction;

the connecting rod frame includes a third connecting rod frame;

the third connecting rod frame includes a first frame arm and a first rotating arm pivotally connected to the first frame arm;

the other end of the first frame arm away from the first rotating arm is connected to the frame longitudinal beam;

the other end of the first rotating arm away from the first frame arm is connected to the bridge housing body;

the shock absorbers include a first shock absorber;

one end of the first shock absorber is connected to the frame longitudinal beam, and the other end is connected to the third support arm;

the air springs include a first air spring distributed in the first longitudinal position and a third air spring distributed in the third longitudinal position;

one side of the first air spring is installed on the first support arm, and the other side is installed on the frame longitudinal beam;

one side of the third air spring is installed on the third support arm, and the other side is installed on the frame longitudinal beam;

the thrust module has a type identification feature that characterizes the performance, and the type identification feature of the thrust module matches the suspension performance requirements of the vehicle;

one side of the first thrust module is connected to the bridge housing body, and the other side is connected to the frame cross beam.

Technical Effects and Advantages of the Present Invention

This application provides a standardized thrust module. The modularization and standardization of the thrust module greatly reduces the suspension adjustment work, so that the air suspension system within the required parameter range can be directly selected according to the required suspension performance, providing a technical solution for lightweight suspension adjustment work.

BRIEF DESCRIPTION OF DRAWINGS

The drawings described herein are used to provide a further understanding of the present application and constitute a part of the present application. The illustrative embodiments of the present application and their descriptions are used to explain the present application and do not constitute an improper limitation on the present application. In the drawings.

Figure 1:
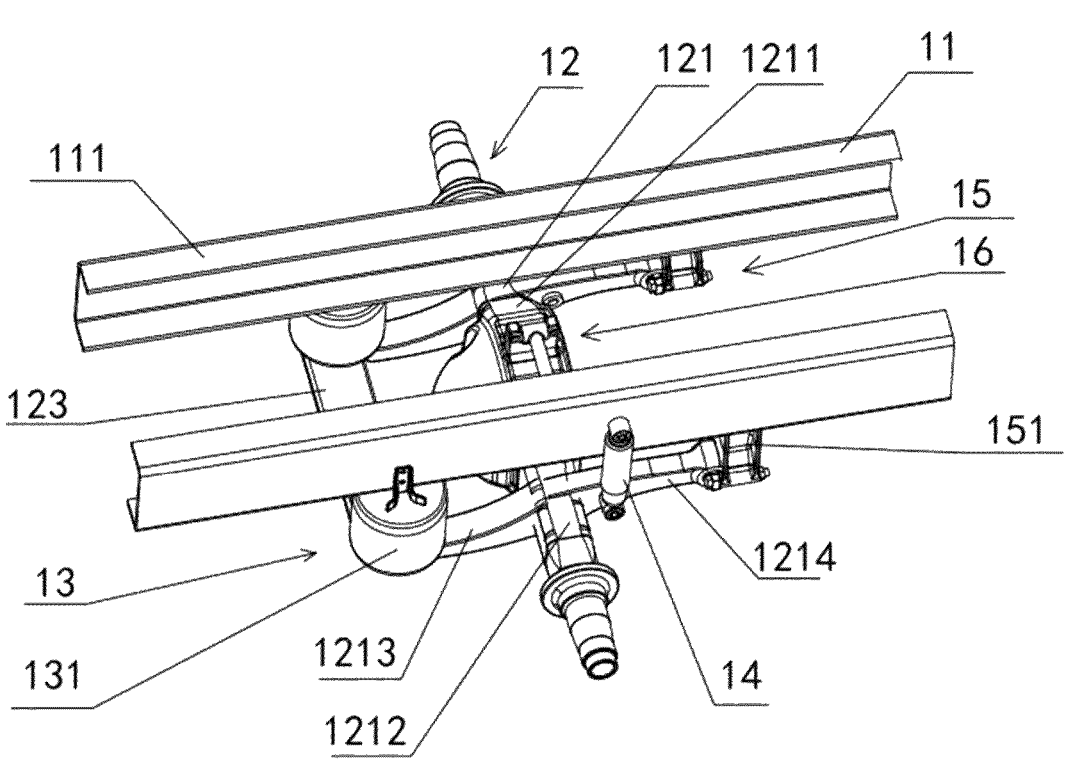
FIG. 1 is a schematic diagram of the structure of an air suspension system provided in an embodiment of the present application.

| | |
|---|---|
| air suspension system | 100 |
| frame | 11 |
| frame longitudinal beam | 111 |
| frame crossbeam | 112 |
| first side mounting seat | 1121 |
| second side mounting seat | 1122 |
| third side mounting seat | 1123 |
| forth side mounting seat | 1124 |
| bridge housing | 12 |
| drive bridge housing | 121 |
| bridge housing body | 1211 |
| half-axle sleeve | 1212 |
| first support arm | 1213 |
| first longitudinal push arm | 1214 |
| first central mounting seat | 1215 |
| third central mounting seat | 1216 |
| fourth central mounting sea | 1217 |
| fifth central mounting seat | 1218 |
| sixth mounting seat | 1219 |
| seventh mounting seat | 1201 |
| eighth mounting seat | 1202 |
| third support arm | 1203 |
| trailer axle housing | 122 |
| axle shaft | 1221 |
| second support arm | 1222 |
| second longitudinal push arm | 1223 |

-continued

| | |
|---|---|
| fourth support arm | 1224 |
| transverse connecting beam | 123 |
| brake baseplate | 124 |
| air springs | 13 |
| first air spring | 131 |
| second air spring | 132 |
| third air spring | 133 |
| fourth air spring | 134 |
| shock absorbers | 14 |
| first shock absorber | 141 |
| second shock absorber | 142 |
| third shock absorber | 143 |
| connecting rod frame | 15 |
| first connecting rod frame | 151 |
| second connecting rod frame | 152 |
| third connecting rod frame | 153 |
| first frame arm | 1531 |
| first rotating arm | 1532 |
| wing plate | 1533 |
| three-dimensional sleeve | 1534 |
| arm sleeve | 1535 |
| arm sleeve shaft | 1536 |
| fourth connecting rod frame | 154 |
| first arm | 1541 |
| second arm | 1542 |
| cylindrical arm support | 1543 |
| three-sided frame support | 1544 |
| rod shaft | 1545 |
| fifth connecting rod frame | 155 |
| second rotating arm | 1551 |
| thrust module | 16 |
| first thrust module | 161 |
| first central rotating sleeve | 1611 |
| first central mounting shaft | 1612 |
| first side rod | 1613 |
| second side rod | 1614 |
| first side rotating sleeve | 1615 |
| first side mounting shaft | 1616 |
| second side rotating sleeve | 1617 |
| second side mounting shaft | 1618 |
| third side rod | 1621 |
| fourth side rod | 1622 |
| third central rotating sleeve | 1623 |
| third central mounting shaft | 1624 |
| third side rotating sleeve | 1625 |
| third side mounting shaft | 1626 |
| fourth central rotating sleeve | 1627 |
| fourth central mounting shaft | 1628 |
| fourth side rotating sleeve | 1629 |
| fourth side mounting shaft | 1620 |
| fifth rotating sleeve | 1631 |
| fifth mounting shaft | 1632 |
| sixth rotating sleeve | 1633 |
| sixth mounting shaft | 1634 |
| seventh rotating sleeve | 1635 |
| seventh mounting shaft | 1636 |
| eighth rotating sleeve | 1637 |
| eighth mounting shaft | 1638 |
| second thrust module | 162 |

DETAILED DESCRIPTION

In order to make the purpose, technical solutions and advantages of the present application clearer, the technical solutions of the present application will be described clearly and completely in the following in combination with specific embodiments of the present application and the corresponding accompanying drawings. Obviously, the described embodiments are only a part of the embodiments of the present application, and not all of the embodiments. Based on the embodiments in the present application, all other embodiments obtained by the person of ordinary skill in the field without making creative labor are within the scope of protection of the present application.

An automobile includes a vehicle chassis, a body carried on the vehicle chassis, and electrical appliances mounted on the body and vehicle chassis.

The function of the automobile chassis is to support and mount the engine and various other parts and assemblies of the automobile, which in turn constitute the automobile as a whole. The power generated by the engine is transmitted to the drive wheels after deceleration and torque increasing to drive the automobile as a whole forward or backward. The automobile chassis is equipped with steering control, brake control and vibration damping buffer and other devices to ensure that the vehicle runs normally.

The automobile chassis consists of a transmission system, a traveling system, a steering system and a braking system.

Specifically, the power of a car is generated by the engine and transmitted to the drive wheels through the clutch, transmission, universal joint, differential and half shafts installed in the drive axle.

The transmission system includes the clutch, transmission, universal joint and drive axle.

The clutch is located between the engine and the transmission. It is a component in the automobile transmission system that is directly connected to the engine and can connect or cut off the engine power.

The actual use of automobiles is very complex, such as starting, idling, low-speed or high-speed driving, acceleration, deceleration, climbing and reversing, etc. These working conditions require that the driving force and speed of the automobile can vary within a fairly large range, while the output torque and speed variation range of the widely used piston engines are relatively small. In order to adapt to the frequently changing driving conditions and make the engine work under favorable working conditions, a transmission is set in the transmission system.

In actual use, it is difficult for the output shaft of the transmission and the input shaft of the drive axle to transmit in a straight line. In addition, during the use of the car, vibrations are caused by factors such as the impact of uneven roads. Therefore, the output shaft of the transmission and the input shaft of the drive axle cannot be rigidly connected, and a universal joint must be used.

The main function of the drive axle is to transfer the engine power or torque from the universal transmission device to the drive wheels by reducing speed and increasing torque. The drive axle is the last assembly in the automobile transmission system, with drive wheels on both sides. The drive axle can be arranged at the front side of the car, at the rear side of the car, or at both the front and rear sides.

The drive bridge includes a drive bridge housing and a differential and a half-axle installed in the drive bridge housing.

In addition to the differential and the half-axle, a main reducer is usually provided in the drive bridge to realize speed reduction and torque increase. At the same time, the main reducer can change the direction of torque transmission. In the drive bridge of a vehicle with a transverse engine arrangement, the main reducer is often a simple helical cylindrical gear. In the longitudinal arrangement of the engine on the drive bridge, the main gear reducer tends to use bevel gears and hypoid gears and other forms. The main reducer decelerates the speed output from the transmission again to increase the torque, after which the power is transferred to the differential. For rear-wheel drive vehicles, such as passenger cars and trucks, the main reducer and differential are mounted in the rear drive bridge, forming one large assembly.

The differential realizes the differential speed of the wheels on both sides to meet the needs of the inner and outer wheels rotating at different speeds.

The drive wheels are connected to the differential by half-axle, in other words, half of the axle between the two drive wheels.

The outer shell part of the drive bridge housing that covers the main reducer and the differential is the drive bridge housing body. The outer shell part of the drive bridge housing that covers the half shaft is the half-axle sleeve.

When the half-axle sleeve is rigidly connected to the drive bridge housing body, the half-axles and drive wheels on both sides cannot move relative to each other in the transverse plane. We call this drive bridge housing an integral drive bridge housing or a non-disconnected drive bridge housing. The integral drive bridge housing has greater strength and rigidity, which is convenient for assembly, adjustment and maintenance of the main reducer, so it is widely used in various types of vehicles. The integral drive bridge housing has high rigidity, high strength, and is easy to cast into an equal strength beam shape, but due to its large mass, the casting quality is not easy to guarantee. It is suitable for medium and heavy-duty vehicles, and is currently mainly used in heavy-duty vehicles.

In order to improve the smoothness of automobile driving and passability, some passenger cars all or part of the drive wheels using independent suspension, that is, the two sides of the drive wheels are connected to the frame with elastic suspension, the two drive wheels can be independent of each other relative to the frame up and down jump. Correspondingly, the drive bridge housing body is fixed on the frame, the drive bridge housing body and half-axle sleeve segmented and connected by hinges, this drive bridge housing is called disconnected drive bridge housing or segmented drive bridge housing. Segmented drive bridge housing is generally divided into two segments, and the two segments are bolted together as a single unit. Segmented drive bridge housing than the whole drive bridge housing is easy to casting, processing is simple, but maintenance is not convenient. When disassembling and inspecting the main reducer, the entire drive bridge must be removed from the car.

The traveling system connects the various assemblies and parts of the car into a whole, supports the mass of the whole car, and ensures that the car moves.

The traveling system includes the frame for mounting the drive train, the wheels, the steering bridge for limiting the relative motion of the wheels with respect to the frame, and the suspension for limiting the motion of the wheels with respect to the frame or body.

The frame is a support that can be used to mount the steering gear, the leaf springs, the fuel tank, the gas tank, the battery, the spare tire, the water tank and the like. The specific realization of the frame can be divided into side-beam frame, platform frame and ridge-beam frame.

The side-beam frame is a rigid structure consisting of two longitudinal beams located on both sides and a number of cross beams riveted or welded together. Because the side beam frame is easy to install the body and arrange the assembly, which is favorable for the modification and development of multi-species models, so it is widely used.

The longitudinal beam of the side beam frame is usually made of low carbon alloy steel plate stamping. Its cross-section shapes include groove cross-section, box cross-section, Z-shaped cross-section and I-shaped cross-section. According to the requirements of automobile form and structural arrangement, the longitudinal beam can be made into curved, isotropic or non-isotropic section in the horizontal plane or longitudinal plane.

The longitudinal beam has many forms, including narrow front and wide rear structure, wide front and narrow rear structure and front and rear equal width structure, as well as parallel structure and curved structure.

The frame crossbeam is not only used to ensure the torsional stiffness of the frame and bear the longitudinal load, but also used to support the main components of the car, such as the radiator, engine, cockpit, driveshaft, spare tire carrier and suspension.

The wheel is a rotating component that carries the load between the tire and the axle, and generally consists of a hub, spokes and rim.

Steering bridge mainly consists of front axle, steering knuckle and main pin, cooperating with wheel hub and steering system to realize steering function. The front axle is the main body of the steering bridge, and its cross-section shape has I-beam or tube shape.

The front axle of the steering bridge is used to reduce the height of the engine, thus lowering the center of gravity of the car, expanding the driver's field of vision, and reducing the angle between the drive shaft and the output shaft of the transmission.

The steering knuckle is the hinge on which the wheels are steered, and is a fork-shaped piece. The upper and lower forks of the fork-shaped piece have two holes with the same axis for installing the main pin.

The role of the main pin is to hinge the front axle and the steering knuckle, so that the steering knuckle swings around the main pin to realize the wheel steering.

The main function of the suspension is to transfer the supporting force, driving force, braking force and lateral reaction force acting on the wheels on the road surface and the moment formed by these reaction forces to the frame or load-bearing body to ensure that the car is traveling normally.

According to whether the wheel movements on both sides of the car are related to each other, the automobile suspension can be divided into non-independent suspension and independent suspension.

Non-independent suspension structure is characterized by the car on both sides of the wheels were installed in an integral axle at both ends, the axle is connected to the frame through the elastic element, when one side of the wheels due to the road is not level and jumping, will affect the other side of the wheel work.

The structure of independent suspension is characterized by the two sides of the wheels were installed in the disconnected axle ends, each section of the axle and wheel alone through the elastic element connected to the frame, when one side of the wheels jump, the other side of the wheels do not have an impact, so it is called independent suspension.

The front wheels of independent suspension can be adjusted for their positioning, so they are widely used in passenger cars, while non-independent suspension is commonly used in medium and heavy commercial vehicles because of its simple structure, easy manufacturing and maintenance.

The steering system ensures that the car is driven according to the driver's will. When the car is traveling on the road, the driver can turn the steering wheel to make the steering wheel deflect according to the road and traffic conditions, and change the driving direction of the car. The mechanism used to change or maintain the direction of travel is called the automobile steering system. The function of the steering system is to control the traveling direction of the car according to the driver's wishes.

The braking system forces the automobile to slow down and stop and park safely in various places according to the needs of automobile traveling. The main function of the braking system is to enable the driver to control the braking force according to the road and traffic, etc., in order to realize a certain degree of forced braking, so that the car decelerates or stops; to ensure that the car travels at a stable speed when driving downhill; and to ensure that the car stops reliably in situ, which also includes stopping on the ramp.

Drum brakes utilize brake shoes to squeeze the wheel hub and obtain braking force, and can be divided into internal tensioned type and external bond type. Internal tension drum brakes use the inner cylindrical surface of the wheel hub as the working surface and are widely used in modern automobiles, while external bond drum brakes use the outer cylindrical surface of the wheel hub as the working surface and are currently only used as parking brakes for very few automobiles.

Referring to FIG. 1, the present application further provides an air suspension system 100, including a frame 11 for mounting a vehicle body, a bridge housing 12 for mounting wheels, and air springs 13, shock absorbers 14, a connecting rod frame 15, and a thrust module 16 connected between the frame 11 and the bridge housing 12;

the frame 11 includes a frame longitudinal beam 111;

the bridge housing 12 includes a drive bridge housing 121;

the drive bridge housing 121 includes a bridge housing body 1211, half-axle sleeves 1212 located on both sides of the bridge housing body 1211, and a first support arm 1213 extending from the half-axle sleeves 1212 along the periphery of the half-axle sleeves 1212 in a first direction and a first longitudinal push arm 1214 extending from the half-axle sleeves 1212 along the periphery of the half-axle sleeves 1212 in a second direction away from the first direction;

the connecting rod frame 15 includes a first connecting rod frame 151;

one end of the first connecting rod frame 151 is connected to the vehicle frame longitudinal beam 111, and the other end is pivotally connected to the first the longitudinal push arm 1214;

the shock absorbers 14 includes a first shock absorber 141;

one end of the first shock absorber 141 is connected to the frame longitudinal beam 111, and the other end is connected to the first longitudinal push arm 1214;

the air springs 13 includes a first air spring 131 distributed in the first longitudinal position;

one side of the first air spring 131 is installed on the first support arm 1213, and the other side is installed on the frame longitudinal beam 111;

the thrust module 16 includes a first thrust module 161;

one side of the first thrust module 161 is connected to the bridge housing body 1211, and the other side is horizontally and vertically connected to the frame longitudinal beam 111.

The frame 11 includes frame longitudinal beams 111.

The frame longitudinal beams 111 are distributed along the longitudinal direction of the vehicle body or along the direction of travel of the vehicle. In addition to supporting the components installed thereon, the mechanical properties of the frame longitudinal beams 111 meet the longitudinal stiffness requirements of the vehicle, especially when the vehicle is accelerating or decelerating, such as starting or braking. The frame longitudinal beams 111 provided in the present application can be made of standard channel steel parts. The channel steel includes a notch and a groove bottom. The frame longitudinal beams 111 are made in a manner that the notches of a pair of channel steels are opposite to each other, and the longitudinal direction of the channel steel is consistent with the longitudinal direction of the vehicle body. In this way, the groove bottoms of a pair of channel steels are arranged in opposite directions to form relatively flat outer sides to prevent collisions with installers during installation or disassembly.

The bridge housing 12 includes a drive bridge housing 121.

The drive bridge housing 121 includes a bridge housing body 1211, half-axle sleeves 1212 located on both sides of the bridge housing body 1211, a first support arm 1213 extending from the half-axle sleeves 1212 along the periphery of the half-axle sleeves 1212 in a first direction, and a first longitudinal push arm 1214 extending in a second direction opposite to the first direction.

The bridge housing body 1211 can cover the main reducer and the differential.

The half-axle sleeves 1212 can cover the half-axle. The half-axle sleeves 1212 can be a hollow sleeve. Depending on the specific application scenario, the half-axle sleeves 1212 can be a cylinder, a square cylinder, or other shapes that are not completely closed in the circumferential direction.

A first support arm 1213 extends from the half-axle sleeves 1212 along the periphery of the half-axle sleeves 1212 in a first direction, and a first longitudinal push arm 1214 extends in a second direction opposite to the first direction.

The first support arm 1213 are arranged in pairs, and the paired first support arm 1213 are distributed on the same side of the bridge housing body 1211 and are symmetrically distributed, so as to facilitate balancing the load of the frame 11. The first support arm 1213 can be used to carry the air springs 13. The first longitudinal push arms 1214 are also arranged in pairs, and the paired first longitudinal push arms 1214 are distributed on the same side of the bridge housing body 1211 and are symmetrically distributed. The first direction in which the first support arm 1213 extend and the second direction in which the first longitudinal push arms 1214 extend are substantially equivalent to the longitudinal direction of the frame longitudinal beam 111.

The connecting rod frame 15 includes a first connecting rod frame 151. One end of the first connecting rod frame 151 is connected to the frame longitudinal beam 111, and the other end is pivotally connected to the first longitudinal push arm 1214. The first connecting rod frame 151 supports the frame longitudinal beam 111 in the vertical direction. The longitudinal load borne by the frame longitudinal beam 111 in the longitudinal direction is transmitted to the first longitudinal push arm 1214 of the bridge housing 12 by the first connecting rod frame 151.

The shock absorbers 14 include a first shock absorber 141. The shock absorber 14 is in a rod shape. The shock absorber 14 is composed of a pair of sleeves nested in each other and hydraulic oil enclosed by the pair of sleeves. When subjected to vibration, the hydraulic oil with a certain viscosity flow in the enclosed space defined by the pair of sleeves to hinder the vibration and absorb the kinetic energy of the vibration. One end of the first shock absorber 141 is connected to the frame longitudinal beam 111, and the other end is connected to the first longitudinal push arm 1214. Therefore, the shock absorbers 14 can buffer the relative movement between the frame longitudinal beam 111 and the bridge housing 12.

The air springs 13 include a first air spring 131 distributed at a first longitudinal position. One side of the first air spring 131 is mounted on the first support arm 1213, and the other side is mounted on the frame longitudinal beam 111.

The thrust module has a type identification feature that characterizes the performance, and the type identification feature of the thrust module matches the suspension performance requirements of the vehicle. The performance of the thrust module can form a performance matrix. For example, longitudinal X stiffness, lateral Y stiffness, vertical Z stiffness, longitudinal X elastic coefficient, lateral Y elastic coefficient, vertical Z elastic coefficient, X-direction torsion resistance, Y-direction torsion resistance, Z-direction torsion resistance, maximum longitudinal impact load, maximum lateral impact load, maximum vertical impact load, etc. The range of performance can be characterized by the type identification feature. In addition, the suspension performance requirements of the vehicle can also be described by the type identification feature. In the specific matching, the performance provided by the thrust module should not be less than the suspension performance requirements of the vehicle, and in a more preferred case, it should have a certain engineering redundancy.

The thrust module 16 includes a first thrust module 161. One side of the first thrust module 161 is connected to the bridge housing body 1211, and the other side is transversely and vertically connected to the frame longitudinal beam 111.

The air springs 13, the shock absorbers 14, and the connecting rod frame 15 are distributed along the longitudinal direction of the frame longitudinal beam 111, and support the frame longitudinal beam 111 from different positions, that is, buffer the relative movement between the frame 11 and the bridge housing 12 in the vertical direction. The thrust module 16 extends along the longitudinal direction of the frame longitudinal beam 111, bears the longitudinal load, that is, buffers the relative movement between the frame 11 and the bridge housing 12 in the horizontal direction of the extension of the frame longitudinal beam 111. Therefore, the air suspension system 100 composed of the frame 11, the bridge housing 12, and the air springs 13, the shock absorbers 14 and the thrust module 16 connected between the frame 11 and the bridge housing 12 is a three-dimensional multi-link system that can maintain relative stability. Since the thrust module is standardized, it can be matched with a suitable thrust module according to different working conditions, thereby making the complex suspension adjustment work lightweight.

Figure 2:
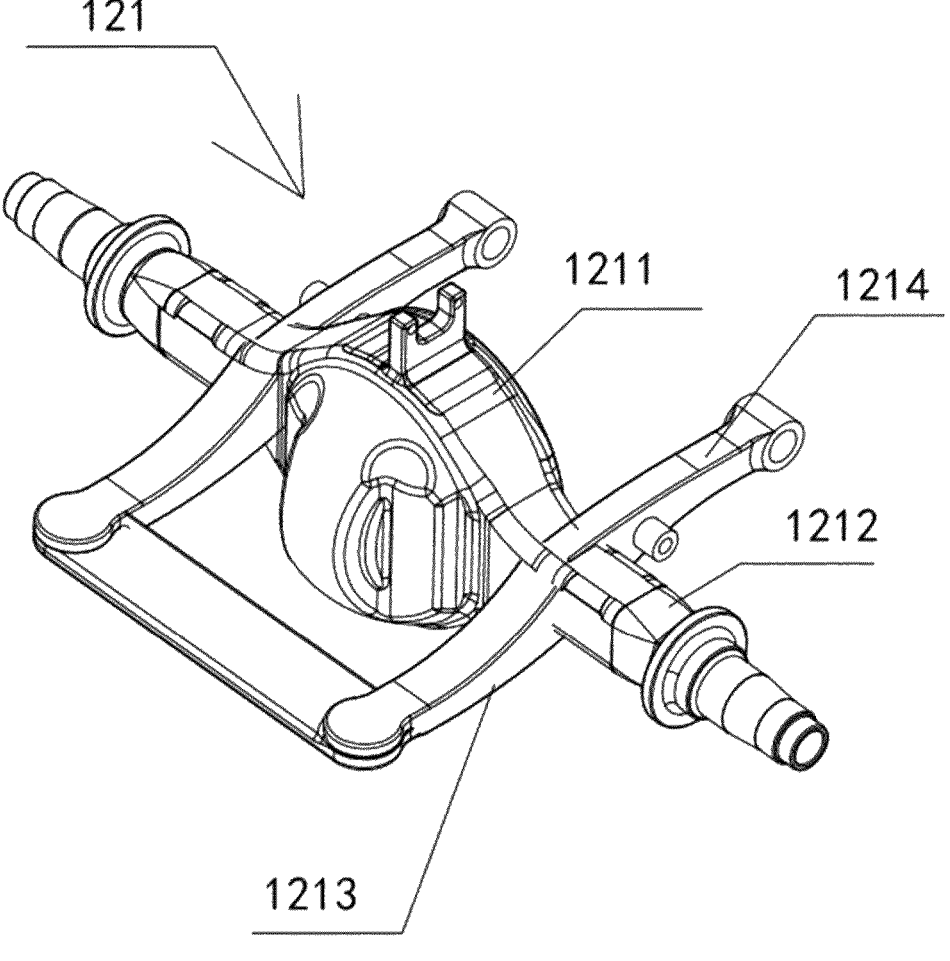
FIG. 2 is a schematic diagram of the structure of the drive axle housing in FIG. 1.

Please refer to FIG. 2. Furthermore, in a preferred embodiment provided in the present application, the bridge housing body 1211 of the drive bridge housing 121 and the half-axle sleeves 1212 are integrally cast or separately cast and then welded into one.

The bridge housing body 1211 of the drive bridge housing 121 and the half-axle sleeves 1212 are cast as one piece, which is beneficial to maintaining the consistency of mechanical properties such as internal strength of the drive bridge housing 121.

The bridge housing body 1211 is generally a cylindrical body with a storage cavity so as to store the reducer shaft and the differential shaft therein. A mounting plate extends upward from the middle of the bridge housing body 1211. The mounting plane of the mounting plate is generally parallel to the frame longitudinal beam 111. The bridge housing body 1211 of the cylindrical body is open at one end and closed at the other end to form a cylinder bottom. The bridge housing body 1211 forms a ridge-like convex bump on the outer surface of the cylinder bottom so as to improve the strength of the bridge housing body 1211.

The two sides of the cylindrical bridge housing body 1211 gradually shrink and extend outwardly to form the half-axle sleeves 1212.

The bridge housing body 1211 and the half-axle sleeves 1212 of the drive bridge housing 121 are integrally cast or separately cast and then welded into one. In this separate casting embodiment, the drive bridge housing 121 can be separately cast, which reduces the casting difficulty of the drive bridge housing 121.

Please refer to FIGS. 3 to 7. Further, in a preferred embodiment provided in the present application, the cross-section of the main part of the extension of the first support arm 1213 is one of the following structures:

a groove surrounded by three sides;

a groove surrounded by three sides and having an intermediate wall extending at the bottom of the groove parallel to the groove wall;

T-shaped;

a ring-shaped groove surrounded by four sides;

H-shaped.

The first support arm 1213 includes a root portion extending from the half-axle sleeves 1212, a main body portion adjacent to the root portion, and a bearing portion for bearing and fixing the air spring 13.

Figure 3:
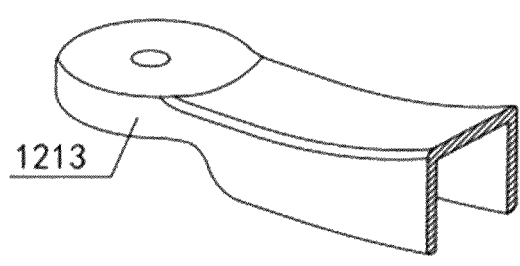
FIG. 3 is a schematic diagram of the structure of a support arm section provided in an embodiment of the present application.

Referring to FIG. 3, in a specific embodiment provided in the present application, the cross section of the main body is a groove structure surrounded on three sides. Due to the groove structure, the edge portion has high bending strength, while the hollow portion is light in weight.

Figure 4:
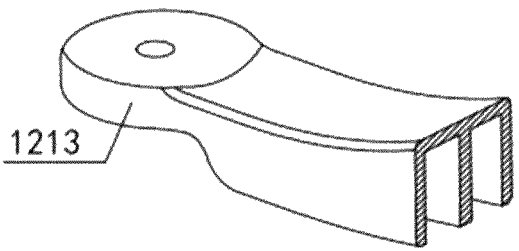
FIG. 4 is a schematic diagram of the structure of the second support arm section provided in an embodiment of the present application.

Please refer to FIG. 4. In another specific embodiment provided in the present application, the cross section of the main body portion is a groove surrounded on three sides and having a middle wall extending at the bottom of the groove parallel to the groove wall. Compared with the previous embodiment, the middle portion is strengthened.

Figure 5:
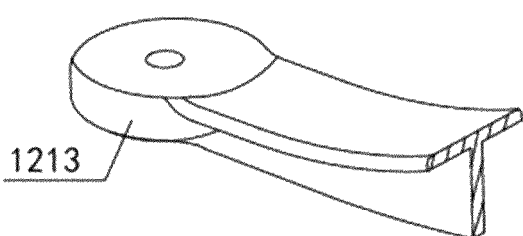
FIG. 5 is a schematic diagram of the structure of the third support arm section provided in an embodiment of the present application.

Please refer to FIG. 5. In another specific embodiment provided in the present application, the cross-section of the main body portion is T-shaped. Due to the T-shaped structure, the elasticity is better.

Figure 6:
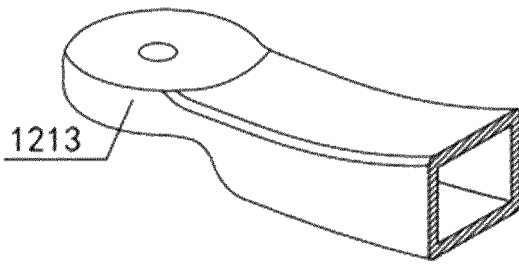
FIG. 6 is a schematic diagram of the structure of the fourth support arm section provided in an embodiment of the present application.

Please refer to FIG. 6, in another specific implementation manner provided in the present application, the cross-section of the main body portion is a ring surrounded on all four sides, which not only has high bending strength but also has good adaptability to eccentric loads.

Figure 7:
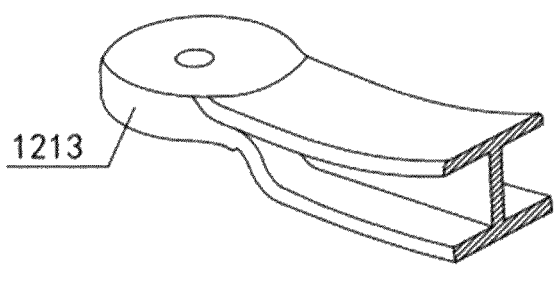
FIG. 7 is a schematic diagram of the structure of the fifth support arm section provided in an embodiment of the present application.

Please refer to FIG. 7. In another specific embodiment provided in the present application, the cross-section of the main body is H-shaped. Compared with the previous embodiment, it has better adaptability to eccentric loads, is lighter in weight, and requires less applicable materials.

Furthermore, in a preferred embodiment provided in the present application, the half-axle sleeve 1212 is in a one-piece shape or has two sections.

Figure 8:
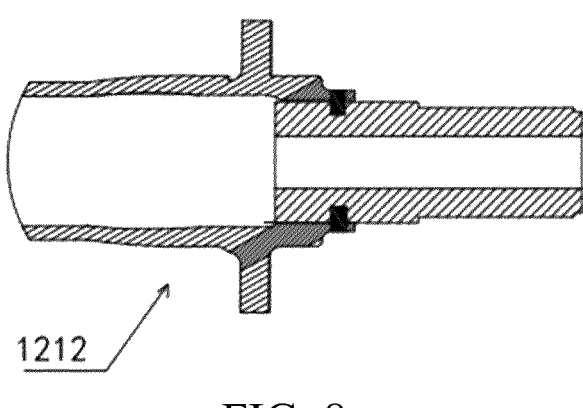
FIG. 8 is a schematic diagram of the structure of a half-axle sleeve provided in an embodiment of the present application.

The half-axle sleeves 1212 can be composed of two sleeves nested together, or can be cast in one piece to meet the needs of different application scenarios. Please refer to FIG. 8, which discloses the cross-sectional structure of the two-section half-axle sleeves 1212. The two-section half-axle sleeves 1212 is axially fixed by a locking pin.

Figure 9:
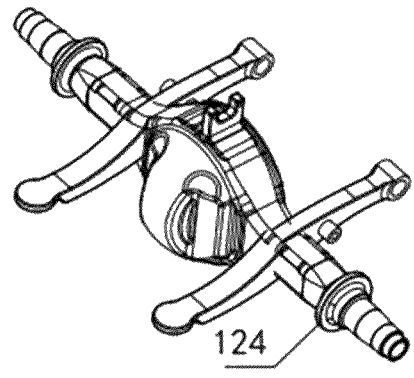
FIG. 9 is a schematic diagram of the structure of a drive axle housing for installing a drum brake provided in an embodiment of the present application.
Figure 10:
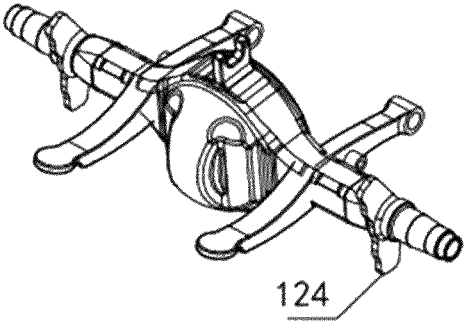
FIG. 10 is a schematic diagram of the structure of a drive axle housing for installing a disc brake provided in an embodiment of the present application.

Please refer to FIGS. 9 and 10. Further, in a preferred embodiment provided in the present application, the bridge housing 12 is integrally cast and includes a circumferentially extending brake base plate 124; the brake base plate 124 is used to install the brake shoe of a drum brake or to install the brake caliper bracket of a disc brake.

The bridge housing 12 is integrally cast and includes a circumferentially extending brake base plate 124. The brake base plate 124 is used to mount a brake shoe of a drum brake or a brake caliper bracket of a disc brake. Thus, the application scope of the technical solution provided by the present application can be expanded.

Please refer to FIG. 1 and FIG. 2, in one embodiment provided in the present application, the first support arms 1213 are arranged in pairs;

the first support arms 1213 arranged in pairs are distributed on the same side of the half-axle sleeves 1212 and are symmetrically distributed;

the air suspension system 100 also includes a transverse connecting beam 123 that transversely connects the paired first support arms 1213.

The first support arms 1213 are arranged in pairs. The first support arms 1213 arranged in pairs are distributed on the same side of the half-axle sleeves 1212 and are symmetrically distributed, so as to facilitate balancing the load of the frame 11. In order to further increase the lateral load of the air suspension system 100, that is, to meet the lateral stiffness when the vehicle turns or tilts, the air suspension system 100 also includes a transverse connecting beam 123 that lateral connects the paired first support arms 1213.

Figure 11:
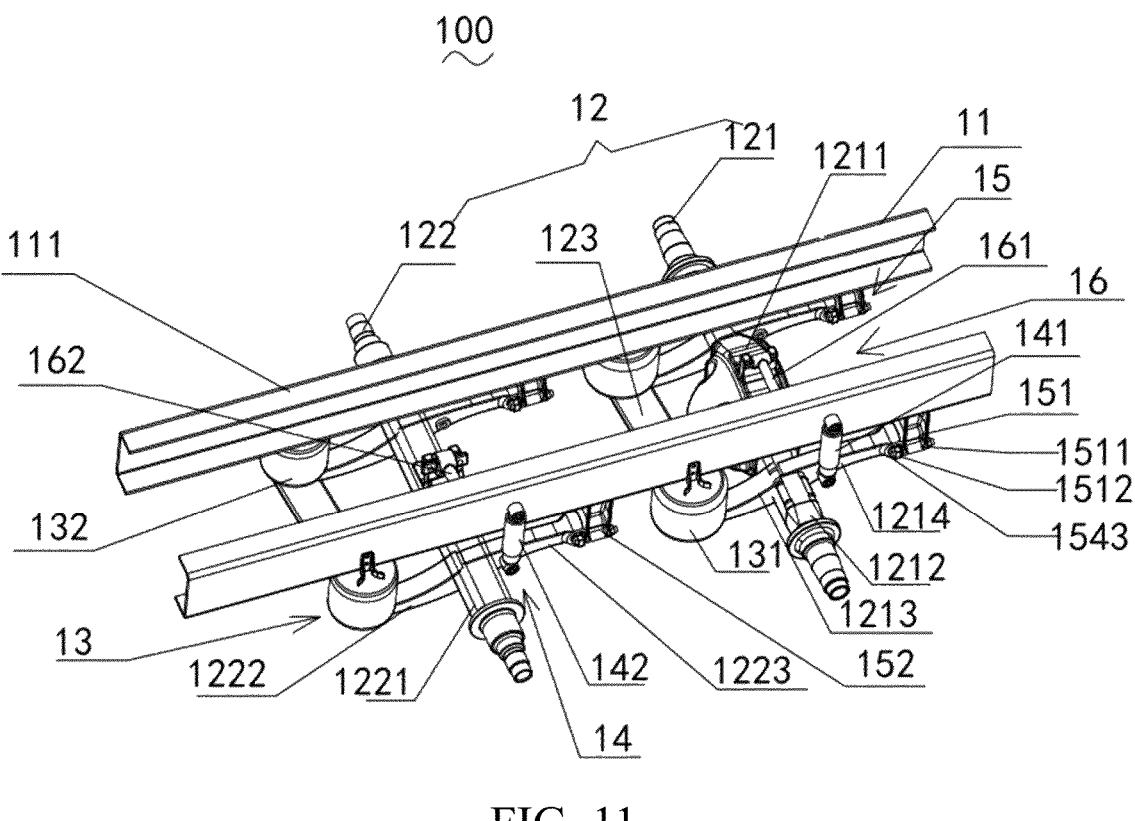
FIG. 11 is a schematic diagram of the structure of an air suspension system having a drive axle housing and a trailer axle housing provided in an embodiment of the present application.

Please refer to FIG. 11. Further, in a preferred embodiment provided in the present application, the bridge housing 12 also includes a trailer axle housing 122;

the trailer axle housing 122 includes an axle shaft 1221, a second support arm 1222 extending from the axle shaft 1221 along the periphery of the axle shaft 1221 toward a first direction, and a second longitudinal push arm 1223 extending from the axle shaft 1221 along the periphery of the axle shaft 1221 toward a second direction away from the first direction;

the connecting rod frame 15 also includes a second connecting rod frame 152;

one end of the second connecting rod frame 152 is connected to the frame longitudinal beam 111, and the other end is pivotally connected to the second longitudinal push arm 1223;

the shock absorbers 14 include a second shock absorber 142;

one end of the second shock absorber 142 is connected to the frame longitudinal beam 111, and the other end is connected to the second longitudinal push arm 1223;

the air springs 13 also include a second air spring 132 distributed in the second longitudinal position;

one side of the second air spring 132 is installed on the second support arm 1222, and the other side is installed on the frame longitudinal beam 111;

the thrust module 16 includes a second thrust module 162;

one side of the second thrust module 162 is connected to the axle shaft 1221, and the other side is horizontally and vertically connected to the frame longitudinal beam 111.

The bridge housing 12 also includes a trailer axle housing 122. The trailer axle housing 122 includes an axle shaft 1221, a second support arm 1222 extending from the axle shaft 1221 along the periphery of the axle shaft 1221 toward a first direction, and a second longitudinal push arm 1223 extending from the axle shaft 1221 along the periphery of the axle shaft 1221 toward a second direction away from the first direction.

The axle shaft 1221 is used to install the driven wheel in the wheels. The axle shaft 1221 can be a solid or a hollow sleeve. Depending on the specific application scenario, the hollow sleeve-shaped axle shaft 1221 can be a cylinder, a square cylinder, or other shapes that are not completely closed in the circumferential direction.

A second support arm 1222 extends from the axle shaft 1221 along the periphery of the axle shaft 1221 toward a first direction, and a second longitudinal push arm 1223 extends from the axle shaft 1221 along the periphery of the axle shaft toward a second direction away from the first direction.

The second support arm 1222 are arranged in pairs, and the paired second support arm 1222 are distributed on the same side of the axle shaft 1221 and are symmetrically distributed, so as to facilitate balancing the load of the frame 11. The second support arm 1222 can be used to carry the air springs 13. The second longitudinal push arms 1223 are also arranged in pairs, and the paired second longitudinal push arms 1223 are distributed on the same side of the axle shaft 1221 and are symmetrically distributed. The first direction in which the second support arms 1222 extend and the second direction in which the second longitudinal push arms 1223 extend are substantially equivalent to the longitudinal direction of the frame longitudinal beam 111.

The connecting rod frame 15 further includes a second connecting rod frame 152. One end of the second connecting rod frame 152 is connected to the frame longitudinal beam 111, and the other end is pivotally connected to the second longitudinal push arm 1223. The second connecting rod frame 152 supports the frame longitudinal beam 111 in the vertical direction. The longitudinal load borne by the frame longitudinal beam 111 in the longitudinal direction is transmitted to the second longitudinal push arm 1223 of the axle shaft 1221 by the second connecting rod frame 152.

The shock absorbers 14 includes a second shock absorber 142. One end of the second shock absorber 142 is connected to the frame longitudinal beam 111, and the other end is connected to the second longitudinal push arm 1223. Thus, the shock absorbers 14 can buffer the relative movement between the frame longitudinal beam 111 and the bridge housing 12.

The air springs 13 further include a second air spring 132 distributed at a second longitudinal position. One side of the second air spring 132 is mounted on the second support arm 1222, and the other side is mounted on the frame longitudinal beam 111.

The thrust module 16 includes a second thrust module 162. One side of the second thrust module 162 is connected to the axle shaft 1221, and the other side is transversely and perpendicularly connected to the frame longitudinal beam 111.

In this embodiment, an air suspension system 100 having a drive bridge housing 121 and a trailer axle housing 122 is provided, which expands the scope of application.

Please refer to FIG. 11. Further, in a preferred embodiment provided in the present application, the first connecting rod frame 151 extends a fork-shaped arm 1511 from the frame longitudinal beam 111;

the first longitudinal push arm 1214 is provided with a cylindrical arm support 1543 at the end;

the first connecting rod frame 151 also includes an arm shaft 1512;

the cylindrical arm support 1543 is embedded in the fork-shaped arm 1511, and the arm shaft 1512 passes through the cylindrical arm support 1543 and is fixedly connected to the fork-shaped arm 1511.

The first connecting rod frame 151 integrally extends a fork-shaped arm 1511 from the frame longitudinal beam 111. A cylindrical arm support 1543 is provided at the end of the first longitudinal push arm 1214. The first connecting rod frame 151 also includes an arm shaft 1512. The cylindrical arm support 1543 is embedded in the fork-shaped arm 1511, and the arm shaft 1512 passes through the cylindrical arm support 1543 and is clamped into the fork-shaped arm 1511.

Furthermore, in a preferred embodiment provided in the present application, the arm shaft 1512 includes a cylindrical section and plate-shaped sections located on both sides of the cylindrical section.

The cylindrical section of the installation shaft arranged in sections is convenient for pivoting, while the plate-shaped section is easy to install and fix. The cylindrical section of the arm shaft 1512 arranged in sections is convenient for pivoting, while the plate-shaped section is easy to install and fix. In one embodiment provided in the present application, the arm shaft 1512 can be composed of a sleeve, a cylindrical rubber ring embedded in the sleeve, and a rod-shaped member inserted into the rubber ring from the outside to the inside. The length of the rod-shaped member is greater than the height of the sleeve and the rubber ring, thereby forming a configuration with a cylindrical section in the center and plate-shaped sections on both sides.

Furthermore, in a preferred embodiment provided in the present application, there are two drive bridge housing 121.

In this embodiment, a technical solution with two drive bridge housing 121 is provided, thereby expanding the application scope of the air suspension system 100.

Furthermore, in a preferred embodiment provided in the present application, the drive bridge housing 121 is used for an electrically driven vehicle.

In this embodiment, a technical solution for using the drive axle housing 121 for an electric drive vehicle is provided, thereby expanding the application scope of the air suspension system 100.

Figure 12:
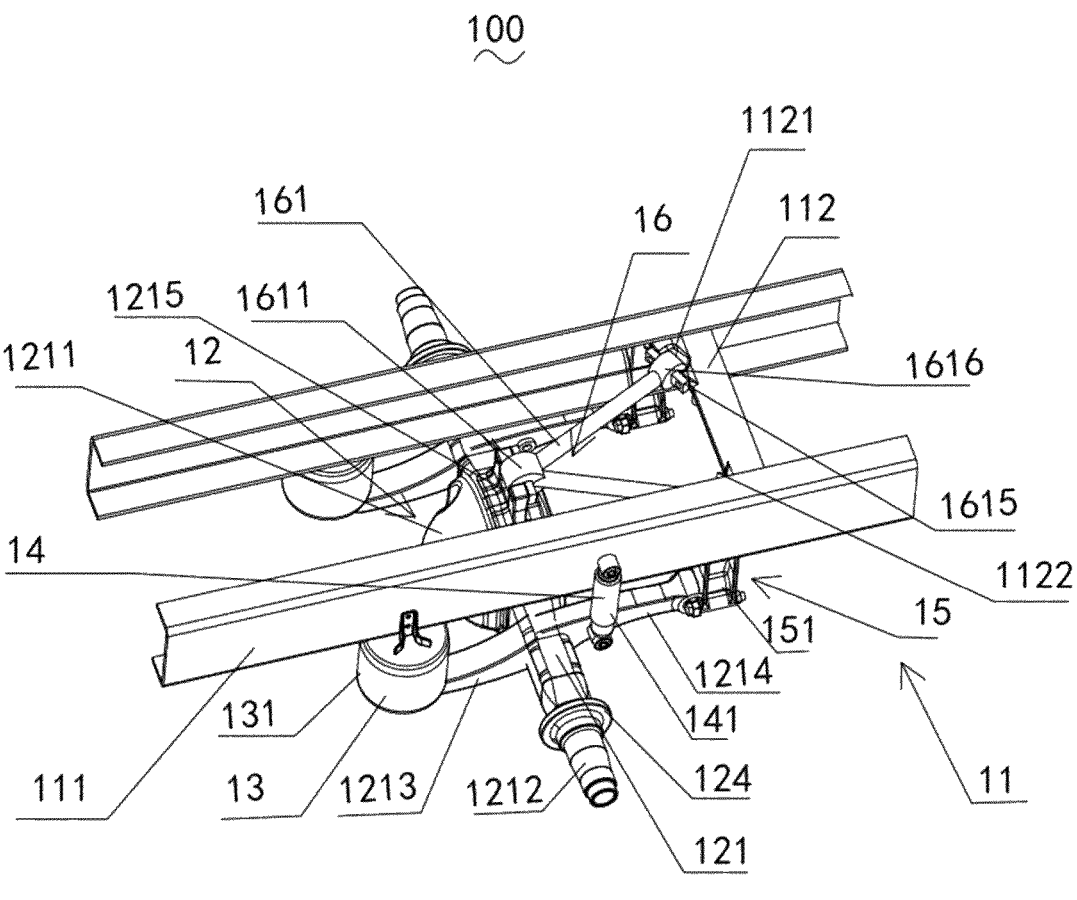
FIG. 12 is a schematic diagram of the structure of another air suspension system provided in an embodiment of the present application.

Please refer to FIG. 12. The present application discloses an air suspension system 100, including: a frame 11 for mounting a vehicle body, a bridge housing 12 for mounting wheels, and air springs 13, shock absorbers 14, a connecting rod frame 15 and a thrust module 16 connected between the frame 11 and the bridge housing 12;

the frame 11 includes a frame longitudinal beam 111 and a frame crossbeam 112 transversely connecting the frame longitudinal beam 111;

the bridge housing 12 includes a drive bridge housing 121;

the drive bridge housing 121 includes a bridge housing body 1211, half-axle sleeves 1212 located on both sides of the bridge housing body 1211, and a first support arm 1213 extending from the half-axle sleeves 1212 along the periphery of the half-axle sleeves 1212 toward a first direction and a first longitudinal push arm 1214 extending from the half-axle sleeves 1212 along the periphery of the half-axle sleeves 1212 toward a second direction away from the first direction;

the connecting rod frame 15 includes a first connecting rod frame 151;

the first connecting rod frame 151 has one end connected to the frame longitudinal beam 111, and the other end is pivotally connected to the first longitudinal push arm 1214;

the shock absorbers 14 include a first shock absorber 141;

the first shock absorber 141 has one end connected to the frame longitudinal beam 111, and the other end connected to the first longitudinal push arm 1214;

the air springs 13 include a first air spring 131 distributed in the first longitudinal position;

the first air spring 131 is installed on the first support arm 1213 on one side, and installed on the frame longitudinal beam 111 on the other side;

the thrust module 16 has a type identification feature that characterizes the performance, and the type identification feature of the thrust module 16 matches the suspension performance requirements of the vehicle;

the thrust module 16 includes a first thrust module 161;

the first thrust module 161 is connected to the bridge housing body 1211 on one side, and connected to the frame crossbeam 112 on the other side.

The frame 11 includes a frame longitudinal beam 111 and a frame crossbeam 112 transversely connecting the frame longitudinal beam 111.

The frame longitudinal beams 111 are distributed along the longitudinal direction of the vehicle body or along the direction of travel of the vehicle. In addition to supporting the components installed thereon, the mechanical properties of the frame longitudinal beams 111 meet the longitudinal stiffness requirements of the vehicle, especially when the vehicle is accelerating or decelerating, such as starting or braking. The frame longitudinal beams 111 provided in the present application can be made of standard channel steel parts. The channel steel includes a notch and a groove bottom. The frame longitudinal beams 111 are made in a manner that the notches of a pair of channel steels are opposite to each other, and the longitudinal direction of the channel steel is consistent with the longitudinal direction of the vehicle body. In this way, the groove bottoms of a pair of channel steels are arranged in opposite directions to form relatively flat outer sides to prevent collisions with installers during installation or disassembly.

The frame crossbeam 112 is in the shape of a rod or a tube, and is installed in the space surrounded by the notches of a pair of channel steels of the frame longitudinal beam 111. During specific assembly, the frame crossbeam 112 and the frame longitudinal beam 111 can be bolted or welded. The mechanical properties of the frame crossbeam 112 meet the lateral stiffness requirements of the vehicle or the stiffness requirements of the frame 11 when it tilts laterally.

The frame longitudinal beam 111 and the frame crossbeam 112 are combined to form the frame 11, which can be used to install a steering gear, a leaf spring, a fuel tank, a gas tank, a battery, a spare tire, a water tank, and support the vehicle body.

The bridge housing 12 includes a drive bridge housing 121.

The drive bridge housing 121 includes a bridge housing body 1211, half-axle sleeves 1212 located on both sides of the bridge housing body 1211, a first support arm 1213 extending from the half-axle sleeves 1212 along the periphery of the half-axle sleeves 1212 in a first direction, and a first longitudinal push arm 1214 extending in a second direction opposite to the first direction.

The bridge housing body 1211 can cover the main reducer and the differential.

The half-axle sleeves 1212 can cover the half-axle. The half-axle sleeves 1212 can be a hollow sleeve. Depending on the specific application scenario, the half-axle sleeves 1212 can be a cylinder, a square cylinder, or other shapes that are not completely closed in the circumferential direction.

A first support arm 1213 extends from the half-axle sleeves 1212 along the periphery of the half-axle sleeves 1212 in a first direction, and a first longitudinal push arm 1214 extends in a second direction opposite to the first direction.

The first support arm 1213 are arranged in pairs, and the paired first support arm 1213 are distributed on the same side of the bridge housing body 1211 and are symmetrically distributed, so as to facilitate balancing the load of the frame 11. The first support arm 1213 can be used to carry the air springs 13. The first longitudinal push arms 1214 are also arranged in pairs, and the paired first longitudinal push arms 1214 are distributed on the same side of the bridge housing body 1211 and are symmetrically distributed. The first direction in which the first support arm 1213 extend and the second direction in which the first longitudinal push arms 1214 extend are substantially equivalent to the longitudinal direction of the frame longitudinal beam 111.

The connecting rod frame 15 includes a first connecting rod frame 151. One end of the first connecting rod frame 151 is connected to the frame longitudinal beam 111, and the other end is pivotally connected to the first longitudinal push arm 1214. The first connecting rod frame 151 supports the frame longitudinal beam 111 in the vertical direction. The longitudinal load borne by the frame longitudinal beam 111 in the longitudinal direction is transmitted to the first longitudinal push arm 1214 of the bridge housing 12 by the first connecting rod frame 151.

The shock absorbers 14 include a first shock absorber 141. The shock absorber 14 is in a rod shape. The shock absorber 14 is composed of a pair of sleeves nested in each other and hydraulic oil enclosed by the pair of sleeves. When subjected to vibration, the hydraulic oil with a certain viscosity flow in the enclosed space defined by the pair of sleeves to hinder the vibration and absorb the kinetic energy of the vibration. One end of the first shock absorber 141 is connected to the frame longitudinal beam 111, and the other end is connected to the first longitudinal push arm 1214. Therefore, the shock absorbers 14 can buffer the relative movement between the frame longitudinal beam 111 and the bridge housing 12.

The air springs 13 include a first air spring 131 distributed at a first longitudinal position. One side of the first air spring 131 is mounted on the first support arm 1213, and the other side is mounted on the frame longitudinal beam 111.

The thrust module has a type identification feature that characterizes the performance, and the type identification feature of the thrust module matches the suspension performance requirements of the vehicle. The performance of the thrust module can form a performance matrix. For example, longitudinal X stiffness, lateral Y stiffness, vertical Z stiffness, longitudinal X elastic coefficient, lateral Y elastic coefficient, vertical Z elastic coefficient, X-direction torsion resistance, Y-direction torsion resistance, Z-direction torsion resistance, maximum longitudinal impact load, maximum lateral impact load, maximum vertical impact load, etc. The range of performance can be characterized by the type identification feature. In addition, the suspension performance requirements of the vehicle can also be described by the type identification feature. In the specific matching, the performance provided by the thrust module should not be less than the suspension performance requirements of the vehicle, and in a more preferred case, it should have a certain engineering redundancy.

The thrust module 16 includes a first thrust module 161. One side of the first thrust module 161 is connected to the bridge housing body 1211, and the other side is connected to the frame crossbeam 112.

The air springs 13, the shock absorbers 14, and the connecting rod frame 15 are distributed along the longitudinal direction of the frame longitudinal beam 111, and support the frame longitudinal beam 111 from different positions, that is, buffer the relative movement between the frame 11 and the bridge housing 12 in the vertical direction. The thrust module 16 extends along the longitudinal direction of the frame longitudinal beam 111, bears the longitudinal load, that is, buffers the relative movement between the frame 11 and the bridge housing 12 in the horizontal direction of the extension of the frame longitudinal beam 111. Therefore, the air suspension system 100 composed of the frame 11, the bridge housing 12, and the air springs 13, the shock absorbers 14 and the thrust module 16 connected between the frame 11 and the bridge housing 12 is a three-dimensional multi-link system that can maintain relative stability. Since the thrust module is standardized, it can be matched with a suitable thrust module according to different working conditions, thereby making the complex suspension adjustment work lightweight.

Figure 13:
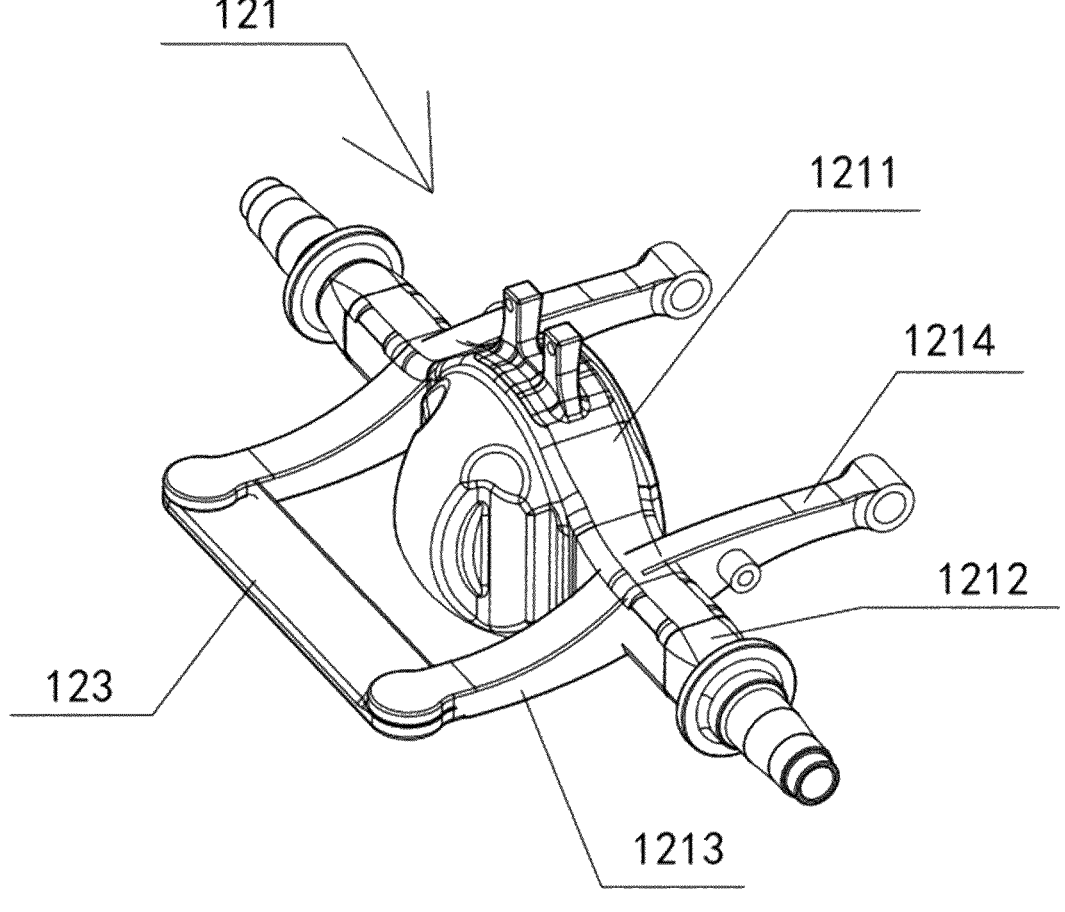
FIG. 13 is a schematic diagram of the structure of the drive axle housing in FIG. 12.

Please refer to FIG. 13. Further, in a preferred embodiment provided in the present application, the bridge housing body 1211 of the bridge housing 12 and the half-axle sleeves 1212 are integrally cast or separately cast and then welded into one.

The bridge housing body 1211 of the drive bridge housing 121 and the half-axle sleeves 1212 are cast as one piece, which is beneficial to maintaining the consistency of mechanical properties such as internal strength of the drive bridge housing 121.

The bridge housing body 1211 is generally a cylindrical body with a storage cavity so as to store the reducer shaft and the differential shaft therein. A mounting plate extends upward from the middle of the bridge housing body 1211. The mounting plane of the mounting plate is generally parallel to the frame longitudinal beam 111. The bridge housing body 1211 of the cylindrical body is open at one end and closed at the other end to form a cylinder bottom. The bridge housing body 1211 forms a ridge-like convex bump on the outer surface of the cylinder bottom so as to improve the strength of the bridge housing body 1211.

The two sides of the cylindrical bridge housing body 1211 gradually shrink and extend outwardly to form the half-axle sleeves 1212.

The bridge housing body 1211 and the half-axle sleeves 1212 of the drive bridge housing 121 are integrally cast or separately cast and then welded into one. In this separate casting embodiment, the drive bridge housing 121 can be separately cast, which reduces the casting difficulty of the drive bridge housing 121.

Please refer to FIGS. 3 to 7. Further, in a preferred embodiment provided in the present application, the cross-section of the main part of the extension of the first support arm 1213 is one of the following structures:

a groove surrounded by three sides;

a groove surrounded by three sides and having an intermediate wall extending at the bottom of the groove parallel to the groove wall;

T-shaped;

a ring-shaped groove surrounded by four sides;

H-shaped.

The first support arm 1213 includes a root portion extending from the half-axle sleeves 1212, a main body portion adjacent to the root portion, and a bearing portion for bearing and fixing the air spring 13.

Referring to FIG. 3. In a specific embodiment provided in the present application, the cross section of the main body is a groove structure surrounded on three sides. Due to the groove structure, the edge portion has high bending strength, while the hollow portion is light in weight.

Please refer to FIG. 4. In another specific embodiment provided in the present application, the cross section of the main body portion is a groove surrounded on three sides and having a middle wall extending at the bottom of the groove parallel to the groove wall. Compared with the previous embodiment, the middle portion is strengthened.

Please refer to FIG. 5. In another specific embodiment provided in the present application, the cross-section of the main body portion is T-shaped. Due to the T-shaped structure, the elasticity is better.

Please refer to FIG. 6. In another specific implementation manner provided in the present application, the cross-section of the main body portion is a ring surrounded on all four sides, which not only has high bending strength but also has good adaptability to eccentric loads.

Please refer to FIG. 7. In another specific embodiment provided in the present application, the cross-section of the main body is H-shaped. Compared with the previous embodiment, it has better adaptability to eccentric loads, is lighter in weight, and requires less applicable materials.

Furthermore, in a preferred embodiment provided in the present application, the half-axle sleeve 1212 is in a one-piece shape or has two sections.

The half-axle sleeves 1212 can be composed of two sleeves nested together, or can be cast in one piece to meet the needs of different application scenarios. Please refer to FIG. 8, which discloses the cross-sectional structure of the two-section half-axle sleeves 1212. The two-section half-axle sleeves 1212 is axially fixed by a locking pin.

Furthermore, in a preferred embodiment provided in the present application, the bridge housing 12 is integrally cast and includes a circumferentially extending brake base plate 124; the brake base plate 124 is used to install the brake shoe of a drum brake or to install the brake caliper bracket of a disc brake.

The bridge housing 12 is integrally cast and includes a circumferentially extending brake base plate 124. The brake base plate 124 is used to mount a brake shoe of a drum brake or a brake caliper bracket of a disc brake. Thus, the application scope of the technical solution provided by the present application can be expanded.

Please refer to FIG. 12. Further, in a preferred embodiment provided in the present application, the first thrust module 161 includes a first central rotating sleeve 1611, a first central mounting shaft 1612 passing through the first central rotating sleeve 1611 and pivoting relative to the first central rotating sleeve 1611, and a first side rod 1613 and a second side rod 1614 extending from the first central rotating sleeve 1611 to both sides at a preset angle;

the first side rod 1613 is provided with a first side rotating sleeve 1615 and a first side mounting shaft 1616 passing through the first side rotating sleeve 1615 and pivoting relative to the first side rotating sleeve 1615 at the end;

the second side rod 1614 is provided with a second side rotating sleeve 1617 and a second side mounting shaft 1618 passing through the second side rotating sleeve 1617 and pivoting relative to the second side rotating sleeve 1617 at the end;

the frame crossbeam 112 is respectively provided with a first side mounting seat 1121 matched with the first side mounting shaft 1616 and a second side mounting seat 1122 matched with the second side mounting shaft 1618;

the bridge housing body 1211 is provided with a first central mounting seat 1215 matched with the first central mounting shaft 1612;

the first central mounting shaft 1612 is matched with the first central mounting seat 1215;

the first side mounting shaft 1616 is matched with the first side mounting seat 1121;

the second side mounting shaft 1618 is matched with the second side mounting seat 1122.

The first thrust module 161 includes a first central rotating sleeve 1611, a first central mounting shaft 1612 passing through the first central rotating sleeve 1611 and pivoting relative to the first central rotating sleeve 1611, and a first side rod 1613 and a second side rod 1614 extending from the first central rotating sleeve 1611 to both sides at a preset angle. The first central rotating sleeve 1611 is sleeve-shaped. The first central mounting shaft 1612 is inserted into the first central rotating sleeve 1611 and can be fixed relative to the bridge housing body 1211.

The first side rod 1613 has a first side rotating sleeve 1615 and a first side mounting shaft 1616 passing through the first side rotating sleeve 1615 and pivoting relative to the first side rotating sleeve 1615 at the end thereof. The first side rotating sleeve 1615 is sleeve-shaped. The first side mounting shaft 1616 is inserted into the first side rotating sleeve 1615 and can be fixed relative to the frame crossbeam 112.

The second side rod 1614 has a second side rotating sleeve 1617 and a second side mounting shaft 1618 passing through the second side rotating sleeve 1617 and pivoting relative to the second side rotating sleeve 1617 at its end. The second side rotating sleeve 1617 is sleeve-shaped. The second side mounting shaft 1618 is inserted into the second side rotating sleeve 1617 and can be fixed relative to the frame crossbeam 112.

The first side rod 1613 and the second side rod 1614 are at a preset angle, which is an acute angle.

The frame crossbeam 112 is respectively provided with a first side mounting seat 1121 matched with the first side mounting shaft 1616 and a second side mounting seat 1122 matched with the second side mounting shaft 1618. The bridge housing body 1211 is provided with a first central mounting seat 1215 matched with the first central mounting shaft 1612. The first central mounting shaft 1612 is matched with the first central mounting seat 1215. The first side mounting shaft 1616 is matched with the first side mounting seat 1121. The second side mounting shaft 1618 is matched with the second side mounting seat 1122.

The first side rod 1613 and the second side rod 1614 of the first thrust module 161 are at a preset angle, and the first thrust module 161 and the frame crossbeam 112 are distributed in a triangle. Since the triangle has stability, the air suspension system 100 composed of the frame 11, the bridge housing 12, and the air springs 13, the shock absorbers 14 and the thrust module 16 connected between the frame 11 and the bridge housing 12 has strong stability.

Furthermore, in a preferred embodiment provided in the present application, at least one of the first central mounting shaft 1612, the first side mounting shaft 1616 or the second side mounting shaft 1618 is arranged in sections, including a cylindrical section and plate-like sections located on both sides of the cylindrical section.

The cylindrical section of the segmented installation shaft is easy to pivot, while the plate-shaped section is easy to install and fix. In one embodiment provided in the present application, the installation shaft can be composed of a sleeve, a cylindrical rubber ring embedded in the sleeve, and a rod-shaped member inserted into the rubber ring from the outside to the inside. The length of the rod-shaped member is greater than the depth of the sleeve and the rubber ring, thereby forming a configuration with a cylindrical section in the center and plate-shaped sections on both sides.

Please refer to FIG. 13. Further, in a preferred embodiment provided in the present application, the first support arms 1213 are arranged in pairs;

the first support arms 1213 arranged in pairs are distributed on the same side of the half-axle sleeves 1212 and are symmetrically distributed;

the air suspension system 100 also includes a transverse connecting beam 123 that transversely connects the paired first support arms 1213.

The first support arms 1213 are arranged in pairs. The first support arms 1213 arranged in pairs are distributed on the same side of the half-axle sleeves 1212 and are symmetrically distributed, so as to facilitate balancing the load of the frame 11. In order to further increase the lateral load of the air suspension system 100, that is, to meet the lateral stiffness when the vehicle turns or tilts, the air suspension system 100 also includes a transverse connecting beam 123 that lateral connects the paired first support arms 1213.

Figure 14:
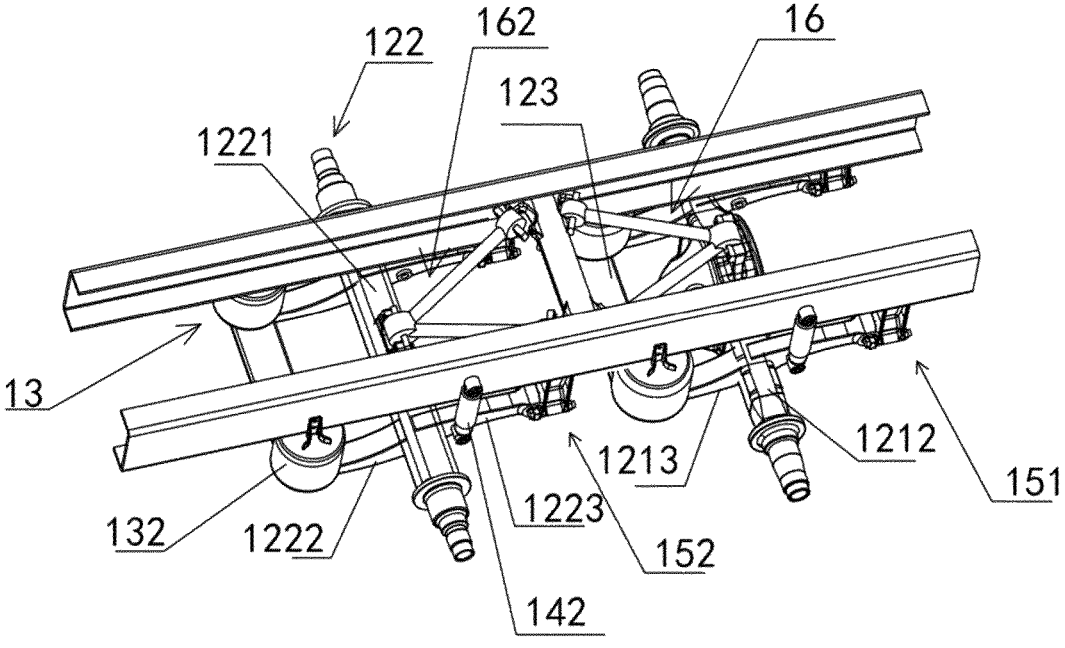
FIG. 14 is a schematic diagram of the structure of another air suspension system with a drive axle housing and a trailer axle housing provided in an embodiment of the present application.

Please refer to FIG. 14. Further, in a preferred embodiment provided in the present application, the bridge housing 12 also includes a trailer axle housing 122;

the trailer axle housing 122 includes an axle shaft 1221, a second support arm 1222 extending from the axle shaft 1221 along the periphery of the axle shaft 1221 toward a first direction, and a second longitudinal push arm 1223 extending from the axle shaft 1221 along the periphery of the axle shaft 1221 toward a second direction away from the first direction;

the connecting rod frame 15 also includes a second connecting rod frame 152;

one end of the second connecting rod frame 152 is connected to the frame longitudinal beam 111, and the other end is pivotally connected to the second longitudinal push arm 1223;

the shock absorbers 14 includes a second shock absorber 142;

one end of the second shock absorber 142 is connected to the frame longitudinal beam 111, and the other end is connected to the second longitudinal push arm 1223;

the air springs 13 also include a second air spring 132 distributed in the second longitudinal position;

one side of the second air spring 132 is installed on the second support arm 1222, and the other side is installed on the frame longitudinal beam 111;

the thrust module 16 includes a second thrust module 162;

one side of the second thrust module 162 is connected to the bridge shaft 1221, and the other side is connected to the frame crossbeam 112.

The bridge housing 12 also includes a trailer axle housing 122. The trailer axle housing 122 includes an axle shaft 1221, a second support arm 1222 extending from the axle shaft 1221 along the periphery of the axle shaft 1221 toward a first direction, and a second longitudinal push arm 1223 extending from the axle shaft 1221 along the periphery of the axle shaft 1221 toward a second direction away from the first direction.

The axle shaft 1221 is used to install the driven wheel in the wheels. The axle shaft 1221 can be a solid or a hollow sleeve. Depending on the specific application scenario, the hollow sleeve-shaped axle shaft 1221 can be a cylinder, a square cylinder, or other shapes that are not completely closed in the circumferential direction.

A second support arm 1222 extends from the axle shaft 1221 along the periphery of the axle shaft 1221 toward a first direction, and a second longitudinal push arm 1223 extends from the axle shaft 1221 along the periphery of the axle shaft toward a second direction away from the first direction.

The second support arm 1222 are arranged in pairs, and the paired second support arm 1222 are distributed on the same side of the axle shaft 1221 and are symmetrically distributed, so as to facilitate balancing the load of the frame 11. The second support arm 1222 can be used to carry the air springs 13. The second longitudinal push arms 1223 are also arranged in pairs, and the paired second longitudinal push arms 1223 are distributed on the same side of the axle shaft 1221 and are symmetrically distributed. The first direction in which the second support arms 1222 extend and the second direction in which the second longitudinal push arms 1223 extend are substantially equivalent to the longitudinal direction of the frame longitudinal beam 111.

The connecting rod frame 15 further includes a second connecting rod frame 152. One end of the second connecting rod frame 152 is connected to the frame longitudinal beam 111, and the other end is pivotally connected to the second longitudinal push arm 1223. The second connecting rod frame 152 supports the frame longitudinal beam 111 in the vertical direction. The longitudinal load borne by the frame longitudinal beam 111 in the longitudinal direction is transmitted to the second longitudinal push arm 1223 of the axle shaft 1221 by the second connecting rod frame 152.

The shock absorbers 14 includes a second shock absorber 142. One end of the second shock absorber 142 is connected to the frame longitudinal beam 111, and the other end is connected to the second longitudinal push arm 1223. Thus, the shock absorbers 14 can buffer the relative movement between the frame longitudinal beam 111 and the bridge housing 12.

The air springs 13 further include a second air spring 132 distributed at a second longitudinal position. One side of the second air spring 132 is mounted on the second support arm 1222, and the other side is mounted on the frame longitudinal beam 111.

The thrust module 16 includes a second thrust module 162. One side of the second thrust module 162 is connected to the axle shaft 1221, and the other side is connected to the frame crossbeam 112.

In this embodiment, an air suspension system 100 having a drive bridge housing 121 and a trailer axle housing 122 is provided, which expands the scope of application.

Furthermore, in a preferred embodiment provided in the present application, there are two drive bridge housing 121.

In this embodiment, a technical solution with two drive bridge housing 121 is provided, thereby expanding the application scope of the air suspension system 100.

Furthermore, in a preferred embodiment provided in the present application, the drive bridge housing 121 is used for an electrically driven vehicle.

In this embodiment, a technical solution for using the drive bridge housing 121 for an electric drive vehicle is provided, thereby expanding the application scope of the air suspension system 100.

Figure 15:
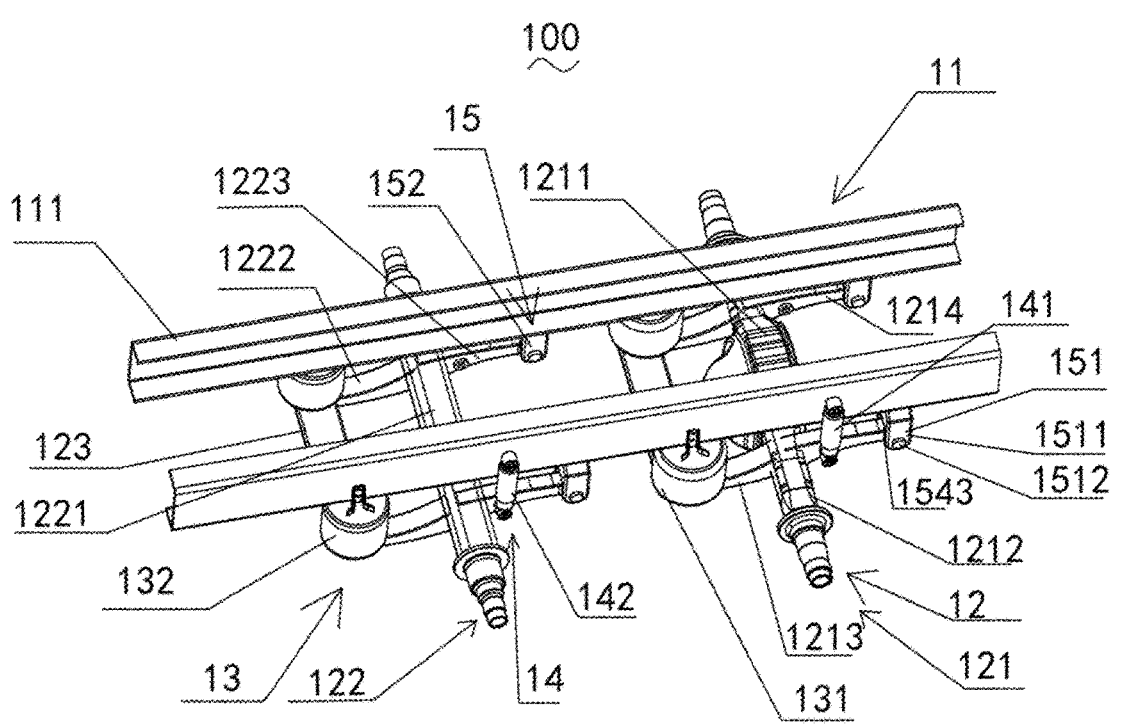
FIG. 15 is a schematic diagram of the structure of another air suspension system with a drive axle housing and a trailer axle housing provided in an embodiment of the present application.

Referring to FIG. 15, the present application further provides an air suspension system 100, including a frame 11 for mounting a vehicle body, a bridge housing 12 for mounting wheels, and air springs 13, shock absorbers 14, and a connecting rod frame 15 connected between the frame 11 and the bridge housing 12;

the frame 11 includes a frame longitudinal beam 111;
the bridge housing 12 includes a drive bridge housing 121;
the drive bridge housing 121 includes an axle housing body 1211, half-axle sleeves 1212 located on both sides of the bridge housing body 1211, and a first support arm 1213 extending from the half-axle sleeves 1212 along the periphery of the half-axle sleeves 1212 in a first direction and a first longitudinal push arm 1214 extending from the half-axle sleeves 1212 along the periphery of the half-axle sleeves in a second direction away from the first direction;

the connecting rod frame 15 includes a first connecting rod frame 151;

the first connecting rod frame 151 has one end connected to the frame longitudinal beam 111, and the other end is pivotally connected to the first longitudinal push arm 1214;

the shock absorbers 14 includes a first shock absorber 141;

the first shock absorber 141 has one end connected to the frame longitudinal beam 111, and the other end connected to the first longitudinal push arm 1214;

the air springs 13 include a first air spring 131 distributed at a first longitudinal position;

the first air spring 131 is installed on the first support arm 1213 on one side, and installed on the frame longitudinal beam 111 on the other side;

the first connecting rod frame 151 extends a fork-shaped arm 1511 from the frame longitudinal beam 111;

the end of the first longitudinal push arm 1214 is provided with a cylindrical arm support 1543;

the first connecting rod frame 151 also includes an arm shaft 1512;

the cylindrical arm support 1543 is embedded in the fork-shaped arm 1511, and the arm shaft 1512 passes through the cylindrical arm support 1543 and is clamped into the fork-shaped arm 1511.

The frame 11 includes a longitudinal beam 111.

The frame longitudinal beams 111 are distributed along the longitudinal direction of the vehicle body or along the direction of travel of the vehicle. In addition to supporting the components installed thereon, the mechanical properties of the frame longitudinal beams 111 meet the longitudinal stiffness requirements of the vehicle, especially when the vehicle is accelerating or decelerating, such as starting or braking. The frame longitudinal beams 111 provided in the present application can be made of standard channel steel parts. The channel steel includes a notch and a groove bottom. The frame longitudinal beams 111 are made in a manner that the notches of a pair of channel steels are opposite to each other, and the longitudinal direction of the channel steel is consistent with the longitudinal direction of the vehicle body. In this way, the groove bottoms of a pair of channel steels are arranged in opposite directions to form relatively flat outer sides to prevent collisions with installers during installation or disassembly.

The bridge housing 12 includes a drive bridge housing 121.

The drive bridge housing 121 includes a bridge housing body 1211, half-axle sleeves 1212 located on both sides of the bridge housing body 1211, a first support arm 1213 extending from the half-axle sleeves 1212 along the periphery of the half-axle sleeves 1212 in a first direction, and a first longitudinal push arm 1214 extending in a second direction opposite to the first direction.

The bridge housing body 1211 can cover the main reducer and the differential.

The half-axle sleeves 1212 can cover the half-axle. The half-axle sleeves 1212 can be a hollow sleeve. Depending on the specific application scenario, the half-axle sleeves 1212 can be a cylinder, a square cylinder, or other shapes that are not completely closed in the circumferential direction.

A first support arm 1213 extends from the half-axle sleeves 1212 along the periphery of the half-axle sleeves 1212 in a first direction, and a first longitudinal push arm 1214 extends in a second direction opposite to the first direction.

The first support arm 1213 are arranged in pairs, and the paired first support arm 1213 are distributed on the same side of the bridge housing body 1211 and are symmetrically distributed, so as to facilitate balancing the load of the frame 11. The first support arm 1213 can be used to carry the air springs 13. The first longitudinal push arms 1214 are also arranged in pairs, and the paired first longitudinal push arms 1214 are distributed on the same side of the bridge housing body 1211 and are symmetrically distributed. The first direction in which the first support arm 1213 extend and the second direction in which the first longitudinal push arms 1214 extend are substantially equivalent to the longitudinal direction of the frame longitudinal beam 111.

The connecting rod frame 15 includes a first connecting rod frame 151. One end of the first connecting rod frame 151 is connected to the frame longitudinal beam 111, and the other end is pivotally connected to the first longitudinal push arm 1214. The first connecting rod frame 151 supports the frame longitudinal beam 111 in the vertical direction. The longitudinal load borne by the frame longitudinal beam 111 in the longitudinal direction is transmitted to the first longitudinal push arm 1214 of the bridge housing 12 by the first connecting rod frame 151.

The shock absorbers 14 include a first shock absorber 141. The shock absorber 14 is in a rod shape. The shock absorber 14 is composed of a pair of sleeves nested in each other and hydraulic oil enclosed by the pair of sleeves. When subjected to vibration, the hydraulic oil with a certain viscosity flow in the enclosed space defined by the pair of sleeves to hinder the vibration and absorb the kinetic energy of the vibration. One end of the first shock absorber 141 is connected to the frame longitudinal beam 111, and the other end is connected to the first longitudinal push arm 1214. Therefore, the shock absorbers 14 can buffer the relative movement between the frame longitudinal beam 111 and the bridge housing 12.

The air springs 13 include a first air spring 131 distributed at a first longitudinal position. One side of the first air spring 131 is mounted on the first support arm 1213, and the other side is mounted on the frame longitudinal beam 111.

Theshenz first connecting rod frame 151 integrally extends a fork-shaped arm 1511 from the frame longitudinal beam 111. A cylindrical arm support 1543 is provided at the end of the first longitudinal push arm 1214. The first connecting rod frame 151 also includes an arm shaft 1512. The cylindrical arm support 1543 is embedded in the fork-shaped arm 1511, and the arm shaft 1512 passes through the cylindrical arm support 1543 and is clamped into the fork-shaped arm 1511.

The air springs 13, the shock absorbers 14, and the connecting rod frame 15 are distributed along the longitudinal direction of the frame longitudinal beam 111, and support the frame longitudinal beam 111 from different positions, that is, buffer the relative movement between the frame 11 and the bridge housing 12 in the vertical direction. The first longitudinal push arm 1214 extends along the longitudinal direction of the frame longitudinal beam 111, bears the longitudinal load, that is, buffers the relative movement between the frame 11 and the bridge housing 12 in the horizontal direction of the extension of the frame longitudinal beam 111. Therefore, the air suspension system 100 composed of the frame 11, the bridge housing 12, and the air springs 13 and the shock absorbers 14 connected between the frame 11 and the bridge housing 12 is a three-dimensional multi-link system, which can maintain relative stability, provide a technical solution with less bumps and impacts, and improve the driving experience.

Figure 16:
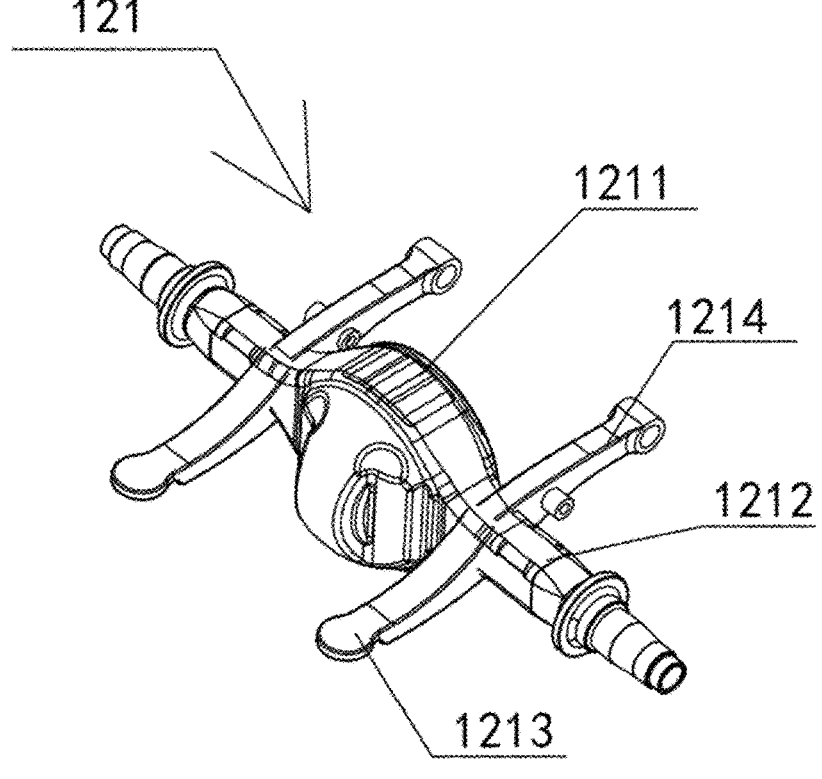
FIG. 16 is a schematic diagram of the structure of the drive axle housing in FIG. 15.

Please refer to FIG. 16. Furthermore, in a preferred embodiment provided in the present application, the bridge housing body 1211 of the bridge housing 12 and the half-axle sleeves 1212 are integrally cast or separately cast and then welded into one.

The bridge housing body 1211 of the drive bridge housing 121 and the half-axle sleeves 1212 are cast as one piece, which is beneficial to maintaining the consistency of mechanical properties such as internal strength of the drive bridge housing 121.

The bridge housing body 1211 is generally a cylindrical body with a storage cavity so as to store the reducer shaft and the differential shaft therein. A mounting plate extends upward from the middle of the bridge housing body 1211. The mounting plane of the mounting plate is generally parallel to the frame longitudinal beam 111. The bridge housing body 1211 of the cylindrical body is open at one end and closed at the other end to form a cylinder bottom. The bridge housing body 1211 forms a ridge-like convex bump on the outer surface of the cylinder bottom so as to improve the strength of the bridge housing body 1211.

The two sides of the cylindrical bridge housing body 1211 gradually shrink and extend outwardly to form the half-axle sleeves 1212.

The bridge housing body 1211 and the half-axle sleeves 1212 of the drive bridge housing 121 are integrally cast or separately cast and then welded into one. In this separate casting embodiment, the drive bridge housing 121 can be separately cast, which reduces the casting difficulty of the drive bridge housing 121.

Please refer to FIGS. 3 to 7. Further, in a preferred embodiment provided in the present application, the cross-section of the main part of the extension of the first support arm 1213 is one of the following structures:

a groove surrounded by three sides;

a groove surrounded by three sides and having an inter-mediate wall extending at the bottom of the groove parallel to the groove wall;

T-shaped;

a ring-shaped groove surrounded by four sides;

H-shaped.

The first support arm 1213 includes a root portion extend-ing from the half-axle sleeves 1212, a main body portion adjacent to the root portion, and a bearing portion for bearing and fixing the air springs 13.

Please refer to FIG. 3. In a specific embodiment provided in the present application, the cross section of the main body is a groove structure surrounded on three sides. Due to the groove structure, the edge portion has high bending strength, while the hollow portion is light in weight.

Please refer to FIG. 4. In another specific embodiment provided in the present application, the cross section of the main body portion is a groove surrounded on three sides and having a middle wall extending at the bottom of the groove parallel to the groove wall. Compared with the previous embodiment, the middle portion is strengthened.

Please refer to FIG. 5. In another specific embodiment provided in the present application, the cross-section of the main body portion is T-shaped. Due to the T-shaped struc-ture, the elasticity is better.

Please refer to FIG. 6. In another specific implementation manner provided in the present application, the cross-section of the main body portion is a ring surrounded on all four sides, which not only has high bending strength but also has good adaptability to eccentric loads.

Please refer to FIG. 7. In another specific embodiment provided in the present application, the cross-section of the main body is H-shaped. Compared with the previous embodiment, it has better adaptability to eccentric loads, is lighter in weight, and requires less applicable materials.

Furthermore, in a preferred embodiment provided in the present application, the half-axle sleeve 1212 is in a one-piece shape or has two sections.

The half-axle sleeves 1212 can be composed of two sleeves nested together, or can be cast in one piece to meet the needs of different application scenarios. Please refer to FIG. 8, which discloses the cross-sectional structure of the two-section half-axle sleeves 1212. The two-section half-axle sleeves 1212 is axially fixed by a locking pin.

Furthermore, in a preferred embodiment provided in the present application, the bridge housing 12 is integrally cast and includes a circumferentially extending brake base plate 124; the brake base plate 124 is used to install the brake shoe of a drum brake or to install the brake caliper bracket of a disc brake.

The bridge housing 12 is integrally cast and includes a circumferentially extending brake base plate 124. The brake base plate 124 is used to mount a brake shoe of a drum brake or a brake caliper bracket of a disc brake. Thus, the application scope of the technical solution provided by the present application can be expanded.

Please refer to FIG. 15. Further, in a preferred embodiment provided in the present application, the first support arms 1213 are arranged in pairs;

the first support arms 1213 arranged in pairs are distributed on the same side of the half-axle sleeves 1212 and are symmetrically distributed;

the air suspension system 100 also includes a transverse connecting beam 123 that transversely connects the paired first support arms 1213.

The first support arms 1213 are arranged in pairs. The first support arms 1213 arranged in pairs are distributed on the same side of the half-axle sleeves 1212 and are symmetrically distributed, so as to facilitate balancing the load of the frame 11. In order to further increase the lateral load of the air suspension system 100, that is, to meet the lateral stiffness when the vehicle turns or tilts, the air suspension system 100 also includes a transverse connecting beam 123 that lateral connects the paired first support arms 1213.

Please refer to FIG. 15. Further, in a preferred embodiment provided in the present application, the axle housing 12 also includes a trailer axle housing 122;

the trailer axle housing 122 includes an axle shaft 1221, a second support arm 1222 extending from the axle shaft 1221 along the periphery of the axle shaft 1221 toward a first direction, and a second longitudinal push arm 1223 extending from the axle shaft 1221 along the periphery of the axle shaft 1221 toward a second direction away from the first direction;

the connecting rod frame 15 also includes a second connecting rod frame 152;

one end of the second connecting rod frame 152 is connected to the frame longitudinal beam 111, and the other end is pivotally connected to the second longitudinal push arm 1223;

the shock absorbers 14 include a second shock absorber 142;

one end of the second shock absorber 142 is connected to the frame longitudinal beam 111, and the other end is connected to the second longitudinal push arm 1223;

the air springs 13 also include a second air spring 132 distributed at a second longitudinal position;

one side of the second air spring 132 is installed on the second support arm 1222, and the other side is installed on the frame longitudinal beam 111.

The bridge housing 12 also includes a trailer axle housing 122. The trailer axle housing 122 includes an axle shaft 1221, a second support arm 1222 extending from the axle shaft 1221 along the periphery of the axle shaft 1221 toward a first direction, and a second longitudinal push arm 1223 extending from the axle shaft 1221 along the periphery of the axle shaft 1221 toward a second direction away from the first direction.

The axle shaft 1221 is used to install the driven wheel in the wheels. The axle shaft 1221 can be a solid or a hollow sleeve. Depending on the specific application scenario, the hollow sleeve-shaped axle shaft 1221 can be a cylinder, a square cylinder, or other shapes that are not completely closed in the circumferential direction.

A second support arm 1222 extends from the axle shaft 1221 along the periphery of the axle shaft 1221 toward a first direction, and a second longitudinal push arm 1223 extends from the axle shaft 1221 along the periphery of the axle shaft toward a second direction away from the first direction.

The second support arm 1222 are arranged in pairs, and the paired second support arm 1222 are distributed on the same side of the axle shaft 1221 and are symmetrically distributed, so as to facilitate balancing the load of the frame 11. The second support arm 1222 can be used to carry the air springs 13. The second longitudinal push arms 1223 are also arranged in pairs, and the paired second longitudinal push arms 1223 are distributed on the same side of the axle shaft 1221 and are symmetrically distributed. The first direction in which the second support arms 1222 extend and the second direction in which the second longitudinal push arms 1223 extend are substantially equivalent to the longitudinal direction of the frame longitudinal beam 111.

The connecting rod frame 15 further includes a second connecting rod frame 152. One end of the second connecting rod frame 152 is connected to the frame longitudinal beam 111, and the other end is pivotally connected to the second longitudinal push arm 1223. The second connecting rod frame 152 supports the frame longitudinal beam 111 in the vertical direction. The longitudinal load borne by the frame longitudinal beam 111 in the longitudinal direction is transmitted to the second longitudinal push arm 1223 of the axle shaft 1221 by the second connecting rod frame 152.

The shock absorbers 14 includes a second shock absorber 142. One end of the second shock absorber 142 is connected to the frame longitudinal beam 111, and the other end is connected to the second longitudinal push arm 1223. Thus, the shock absorbers 14 can buffer the relative movement between the frame longitudinal beam 111 and the bridge housing 12.

The air springs 13 further include a second air spring 132 distributed at a second longitudinal position. One side of the second air spring 132 is mounted on the second support arm 1222, and the other side is mounted on the frame longitudinal beam 111.

In this embodiment, an air suspension system 100 having a drive bridge housing 121 and a trailer axle housing 122 is provided, which expands the scope of application.

Further, in a preferred embodiment provided in the present application, there are two drive bridge housing 121.

Further, in a preferred embodiment provided in the present application, the drive bridge housing 121 is used for an electrically driven vehicle.

In this embodiment, a technical solution for using the drive axle housing 121 for an electric drive vehicle is provided, thereby expanding the application scope of the air suspension system 100.

Figure 17:
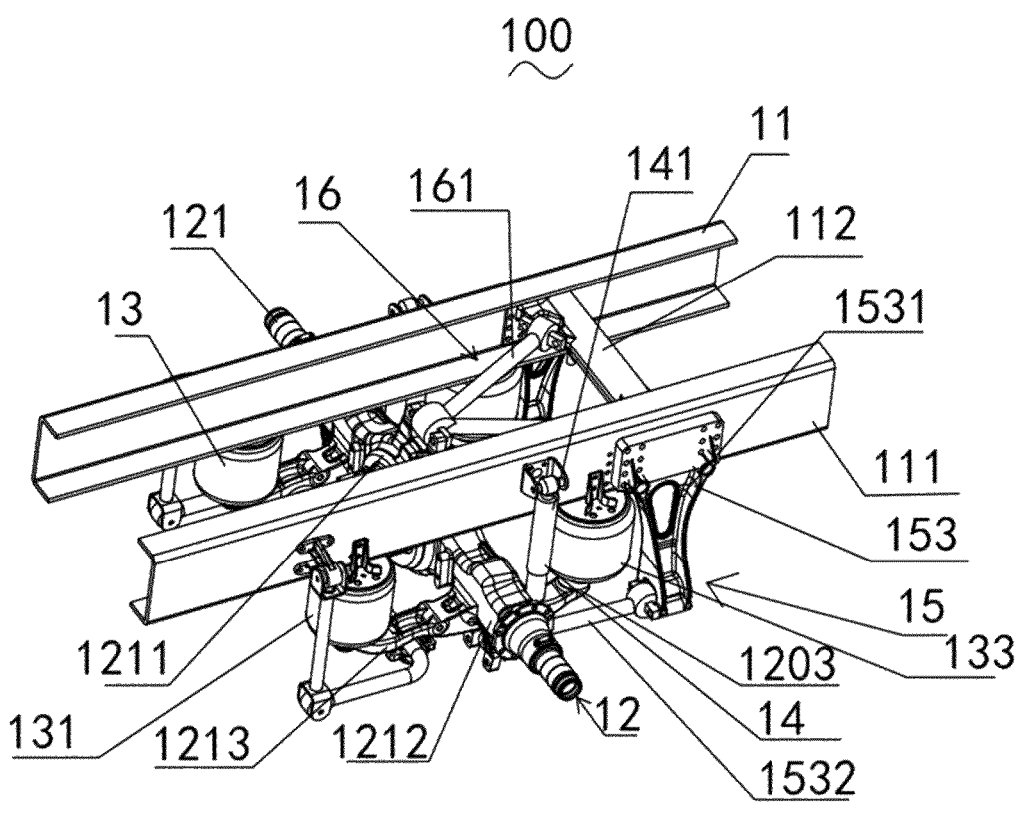
FIG. 17 is a schematic diagram of the structure of another air suspension system provided in an embodiment of the present application.

Referring to FIG. 17, the present application also provides an air suspension system 100, including a frame 11 for mounting a vehicle body, a bridge housing 12 for mounting wheels, and air springs 13, shock absorbers 14, a connecting rod frame 15, and a thrust module 16 connected between the frame 11 and the bridge housing 12;

the frame 11 includes a frame longitudinal beam 111 and a frame crossbeam 112 transversely connecting the frame longitudinal beam 111;

the bridge housing 12 includes a drive bridge housing 121;

the drive bridge housing 12 1 includes a bridge housing body 1211, half-axle sleeves 1212 located on both sides of the bridge housing body 1211, and a first support arm 1213 extending from the half-axle sleeves 1212 along the periphery of the half-axle sleeves 1212 in a first direction and a third support arm 1203 extending from the half-axle sleeves 1212 along the periphery of the half-axles in a second direction away from the first direction;

the connecting rod frame 15 includes a third connecting rod frame 153;

the third connecting rod frame 153 includes a first frame arm 1531 and a first rotating arm 1532 pivotally connected to the first frame arm 1531;

the other end of the first frame arm 1531 away from the first rotating arm 1532 is connected to the frame longitudinal beam 111;

the other end of the first rotating arm 1532 away from the first frame arm 1531 is connected to the bridge housing body 1211;

the shock absorbers 14 include a first shock absorber 141;

one end of the first shock absorber 141 is connected to the frame longitudinal beam 111, and the other end is connected to the third support arm 1203;

the air springs 13 includes a first air spring 131 distributed in the first longitudinal position and a third air spring 133 distributed in the third longitudinal position;

one side of the first air spring 131 is installed on the first support arm 1213, and the other side is installed on the frame longitudinal beam 111;

one side of the third air spring 133 is installed on the third support arm 1203, and the other side is installed on the frame longitudinal beam 111;

one side of the first thrust module 161 is connected to the bridge housing body 1211, and the other side is connected to the frame crossbeam 112.

The frame 11 includes a frame longitudinal beam 111 and a frame crossbeam 112 that transversely connects the frame longitudinal beam 111.

The frame longitudinal beams 111 are distributed along the longitudinal direction of the vehicle body or along the direction of travel of the vehicle. In addition to supporting the components installed thereon, the mechanical properties of the frame longitudinal beams 111 meet the longitudinal stiffness requirements of the vehicle, especially when the vehicle is accelerating or decelerating, such as starting or braking. The frame longitudinal beams 111 provided in the present application can be made of standard channel steel parts. The channel steel includes a notch and a groove bottom. The frame longitudinal beams 111 are made in a manner that the notches of a pair of channel steels are opposite to each other, and the longitudinal direction of the channel steel is consistent with the longitudinal direction of the vehicle body. In this way, the groove bottoms of a pair of channel steels are arranged in opposite directions to form relatively flat outer sides to prevent collisions with installers during installation or disassembly.

The frame crossbeam 112 is rod-shaped or tubular, and is installed in the space surrounded by the notches of a pair of channel steels of the frame longitudinal beam 111. During specific assembly, the frame crossbeam 112 can be bolted or welded to the frame longitudinal beam 111. The mechanical properties of the frame crossbeam 112 meet the rigidity requirements of the vehicle in the lateral direction or the rigidity requirements of the frame 11 when it tilts in the lateral direction.

The frame longitudinal beam 111 and the frame crossbeam 112 are combined to form the frame 11, which can be used to install the steering gear, leaf spring, fuel tank, gas tank, battery, spare tire, water tank, and support the vehicle body.

The bridge housing 12 includes a drive bridge housing 121.

The drive bridge housing 121 includes a bridge housing body 1211, half-axle sleeves 1212 located on both sides of the axle housing body 1211, and a first support arm 1213 extending from the half-axle sleeves 1212 along the periphery of the half-axle sleeves 1212 in a first direction and a third support arm 1203 extending in a second direction opposite to the first direction.

The bridge housing body 1211 can cover the main reducer and the differential.

The half-axle sleeves 1212 can cover the half-axle. The half-axle sleeves 1212 can be a hollow sleeve. Depending on the specific application scenario, the half-axle sleeves 1212 can be a cylinder, a square cylinder, or other shapes that are not completely closed in the circumferential direction.

A first support arm 1213 extending from the half-axle sleeves 1212 along the periphery of the half-axle sleeve 1212 in a first direction and a third support arm 1203 extending in a second direction opposite to the first direction.

The first support arms 1213 are arranged in pairs, and the paired first support arms 1213 are distributed on the same side of the bridge housing body 1211 and are symmetrically distributed, so as to facilitate balancing the load of the frame 11. The first support arm 1213 can be used to carry the air springs 13. The third support arm 1203 is also arranged in pairs, and the paired third support arms 1203 are distributed on the same side of the bridge housing body 1211 and are symmetrically distributed. The first direction in which the first support arm 1213 extends and the second direction in which the third support arm 1203 extends are substantially equivalent to the longitudinal direction of the frame longitudinal beam 111.

The connecting rod frame 15 includes a third connecting rod frame 153. The third connecting rod frame 153 includes a first frame arm 1531 and a first rotating arm 1532 pivotally connected to the first frame arm 1531. The other end of the first frame arm 1531 away from the first rotating arm 1532 is connected to the frame longitudinal beam 111. The other end of the first rotating arm 1532 away from the first frame arm 1531 is connected to the bridge housing body 1211. The first frame arm 1531 supports the frame longitudinal beam 111 in the vertical direction. The longitudinal load borne by the longitudinal direction of the frame longitudinal beam 111 is transmitted to the bridge housing 12 by the first rotating arm 1532.

The shock absorbers 14 include a first shock absorber 141. The shock absorber 14 is rod-shaped. The shock absorber 14 is composed of a pair of sleeves nested in each other and hydraulic oil enclosed by the pair of sleeves. When subjected to vibration, the hydraulic oil with a certain viscosity flow in the enclosed space defined by the pair of sleeves to hinder the vibration and absorb the kinetic energy of the vibration. One end of the first shock absorber 141 is connected to the frame longitudinal beam 111, and the other end is connected to the third support arm 1203. Thus, the shock absorber 14 can buffer the relative movement between the frame longitudinal beam 111 and the bridge housing 12.

The air springs 13 include a first air spring 131 distributed in the first longitudinal position and a third air spring 133 distributed in the third longitudinal position. One side of the first air spring 131 is installed on the first support arm 1213, and the other side is installed on the frame longitudinal beam 111. One side of the third air spring 133 is installed on the third support arm 1203, and the other side is installed on the frame longitudinal beam 111.

The thrust module 16 includes a first thrust module 161. One side of the first thrust module 161 is connected to the bridge housing body 1211, and the other side is connected to the frame crossbeam 112.

The air springs 13, the shock absorbers 14, and the connecting rod frame 15 are distributed along the longitudinal direction of the frame longitudinal beam 111, and support the frame longitudinal beam 111 from different positions, that is, buffer the relative movement between the frame 11 and the bridge housing 12 in the vertical direction. The thrust module 16 extends along the longitudinal direction of the frame longitudinal beam 111, bears the longitudinal load, that is, buffers the relative movement between the frame 11 and the bridge housing 12 in the horizontal direction of the extension of the frame longitudinal beam 111. Therefore, the air suspension system 100 composed of the frame 11, the bridge housing 12, and the air springs 13, the shock absorbers 14 and the thrust module 16 connected between the frame 11 and the bridge housing 12 is a three-dimensional multi-link system, which can maintain relative stability, provide a technical solution with less bumps and impacts, and improve the driving experience.

Figure 18:
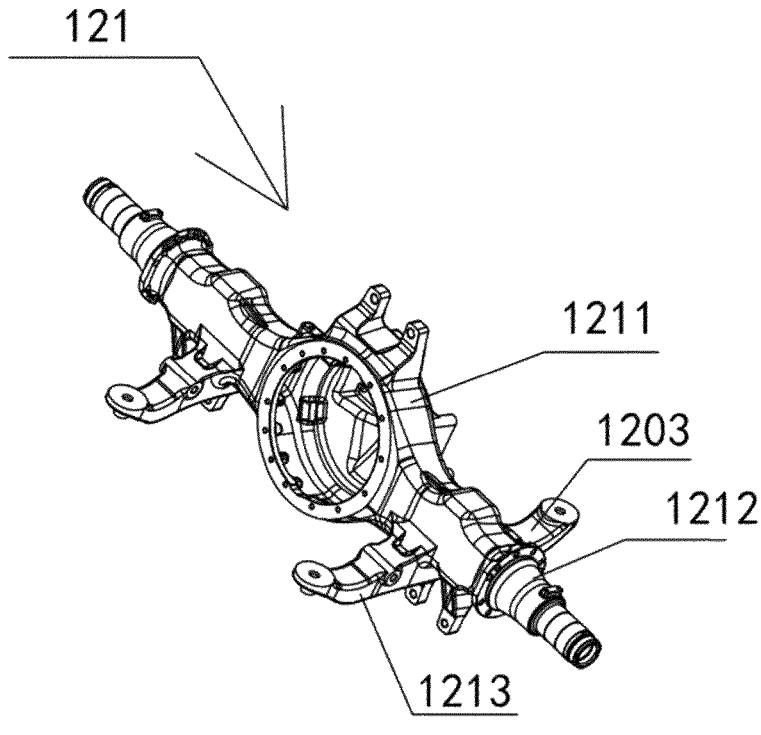
FIG. 18 is a schematic diagram of the structure of the drive axle housing in FIG. 17.

Please refer to FIG. 18. Furthermore, in a preferred embodiment provided in the present application, the bridge housing body 1211 of the bridge housing 12 and the half-axle sleeves 1212 are integrally cast or separately cast and then welded into one.

The bridge housing body 1211 of the drive bridge housing 121 and the half-axle sleeves 1212 are cast as one piece, which is beneficial to maintaining the consistency of mechanical properties such as internal strength of the drive bridge housing 121.

The bridge housing body 1211 is generally a cylindrical body with a storage cavity so as to store the reducer shaft and the differential shaft therein. A mounting plate extends upward from the middle of the bridge housing body 1211. The mounting plane of the mounting plate is generally parallel to the frame longitudinal beam 111. The bridge housing body 1211 of the cylindrical body is open at one end and closed at the other end to form a cylinder bottom. The bridge housing body 1211 forms a ridge-like convex bump on the outer surface of the cylinder bottom so as to improve the strength of the bridge housing body 1211.

The two sides of the axle housing body 1211 of the cylindrical body gradually shrink and extend the half-axle sleeve 1212 outward. At the same time, the half-axle sleeves 1212 is cast as one piece with the first support arm 1213 and the third support arm 1203.

The bridge housing body 1211 and the half-axle sleeves 1212 of the drive bridge housing 121 are integrally cast or separately cast and then welded into one. In this separate casting embodiment, the drive bridge housing 121 can be separately cast, which reduces the casting difficulty of the drive bridge housing 121.

Please refer to FIGS. 3 to 7. Further, in a preferred embodiment provided in the present application, the cross-section of the main part of the extension of the first support arm 1213 is one of the following structures:

a groove surrounded by three sides;

a groove surrounded by three sides and having an intermediate wall extending at the bottom of the groove parallel to the groove wall;

T-shaped;

a ring-shaped groove surrounded by four sides;

H-shaped.

The first support arm 1213 includes a root portion extending from the half-axle sleeves 1212, a main body portion adjacent to the root portion, and a bearing portion for bearing and fixing the air springs 13.

Please refer to FIG. 3. In specific embodiment provided in the present application, the cross section of the main body is a groove structure surrounded on three sides. Due to the groove structure, the edge portion has high bending strength, while the hollow portion is light in weight.

Please refer to FIG. 4. In another specific embodiment provided in the present application, the cross section of the main body portion is a groove surrounded on three sides and having a middle wall extending at the bottom of the groove parallel to the groove wall. Compared with the previous embodiment, the middle portion is strengthened.

Please refer to FIG. 5. In another specific embodiment provided in the present application, the cross-section of the main body portion is T-shaped. Due to the T-shaped structure, the elasticity is better.

Please refer to FIG. 6. In another specific implementation manner provided in the present application, the cross-section of the main body portion is a ring surrounded on all four sides, which not only has high bending strength but also has good adaptability to eccentric loads.

Please refer to FIG. 7. In another specific embodiment provided in the present application, the cross-section of the main body is H-shaped. Compared with the previous embodiment, it has better adaptability to eccentric loads, is lighter in weight, and requires less applicable materials.

Further, in a preferred embodiment provided in the present application, the half-axle sleeve 1212 is in a one-piece shape or has two sections.

The half-axle sleeves 1212 can be composed of two sleeves nested together, or can be cast in one piece to meet the needs of different application scenarios. Please refer to FIG. 8, which discloses the cross-sectional structure of the two-section half-axle sleeves 1212. The two-section half-axle sleeves 1212 is axially fixed by a locking pin.

Furthermore, in a preferred embodiment provided in the present application, the bridge housing 12 is integrally cast and includes a circumferentially extending brake base plate 124; the brake base plate 124 is used to install the brake shoe of a drum brake or to install the brake caliper bracket of a disc brake.

The bridge housing 12 is integrally cast and includes a circumferentially extending brake base plate 124. The brake base plate 124 is used to mount a brake shoe of a drum brake or a brake caliper bracket of a disc brake. Thus, the application scope of the technical solution provided by the present application can be expanded.

Figure 19:
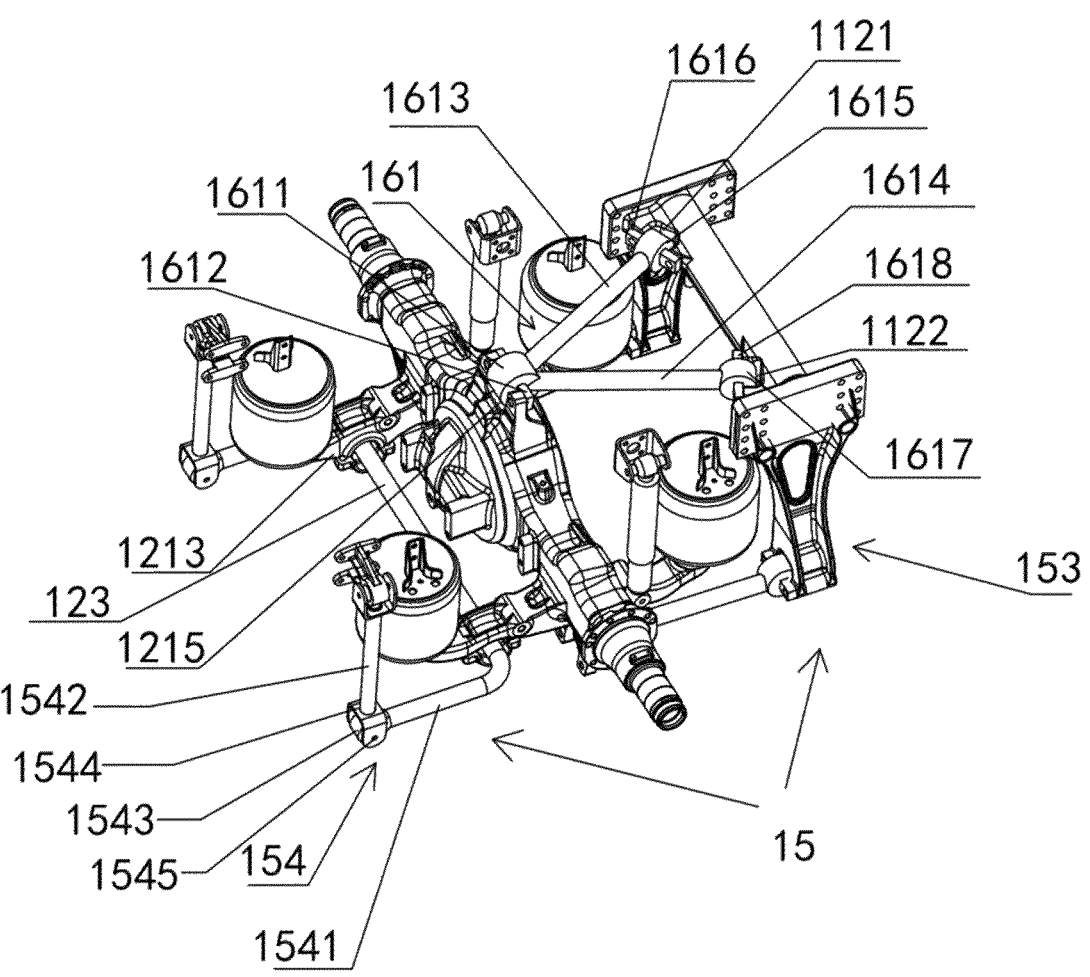
FIG. 19 is a schematic diagram of the structure of an air suspension system of a thrust module provided in an embodiment of the present application.

Please refer to FIG. 19. Further, in a preferred embodiment provided in the present application, the first thrust module 161 includes a first central rotating sleeve 1611, a first central mounting shaft 1612 passing through the first central rotating sleeve 1611 and pivoting relative to the first central rotating sleeve 1611, and a first side rod 1613 and a second side rod 1614 extending from the first central rotating sleeve 1611 to both sides at a preset angle;

the first side rod 1613 is provided with a first side rotating sleeve 1615 and a first side mounting shaft 1616 passing through the first side rotating sleeve 1615 and pivoting relative to the first side rotating sleeve 1615 at the end;

the second side rod 1614 is provided with a second side rotating sleeve 1617 and a second side mounting shaft 1618 passing through the second side rotating sleeve 1617 and pivoting relative to the second side rotating sleeve 1617 at the end;

the frame crossbeam 112 is respectively provided with a first side mounting seat 1121 matched with the first side mounting shaft 1616 and a second side mounting seat 1122 matched with the second side mounting shaft 1618;

the bridge housing body 1211 is provided with a first central mounting seat 1215 matched with the first central mounting shaft 1612;

the first central mounting shaft 1612 is matched with the first central mounting seat 1215;

the first side mounting shaft 1616 is matched with the first side mounting seat 1121;

the second side mounting shaft 1618 is matched with the second side mounting seat 1122.

The first thrust module 161 includes a first central rotating sleeve 1611, a first central mounting shaft 1612 passing through the first central rotating sleeve 1611 and pivoting relative to the first central rotating sleeve 1611, and a first side rod 1613 and a second side rod 1614 extending from the first central rotating sleeve 1611 to both sides at a preset angle. The first central rotating sleeve 1611 is sleeve-shaped. The first central mounting shaft 1612 is inserted into the first central rotating sleeve 1611 and can be fixed relative to the bridge housing body 1211.

The first side rod 1613 has a first side rotating sleeve 1615 and a first side mounting shaft 1616 passing through the first side rotating sleeve 1615 and pivoting relative to the first side rotating sleeve 1615 at the end thereof. The first side rotating sleeve 1615 is sleeve-shaped. The first side mounting shaft 1616 is inserted into the first side rotating sleeve 1615 and can be fixed relative to the frame crossbeam 112.

The second side rod 1614 has a second side rotating sleeve 1617 and a second side mounting shaft 1618 passing through the second side rotating sleeve 1617 and pivoting relative to the second side rotating sleeve 1617 at its end. The second side rotating sleeve 1617 is sleeve-shaped. The second side mounting shaft 1618 is inserted into the second side rotating sleeve 1617 and can be fixed relative to the frame crossbeam 112.

The first side rod 1613 and the second side rod 1614 are at a preset angle. The preset angle is an acute angle.

The frame crossbeam 112 is respectively provided with a first side mounting seat 1121 matched with the first side mounting shaft 1616 and a second side mounting seat 1122 matched with the second side mounting shaft 1618. The bridge housing body 1211 is provided with a first central mounting seat 1215 matched with the first central mounting shaft 1612. The first central mounting shaft 1612 is matched with the first central mounting seat 1215. The first side mounting shaft 1616 is matched with the first side mounting seat 1121. The second side mounting shaft 1618 is matched with the second side mounting seat 1122.

The first side rod 1613 and the second side rod 1614 of the first thrust module 161 are at a preset angle, and the first thrust module 161 and the frame crossbeam 112 are distributed in a triangle. Since the triangle has stability, the air suspension system 100 composed of the frame 11, the bridge housing 12, and the air springs 13, the shock absorbers 14 and the thrust module 16 connected between the frame 11 and the bridge housing 12 has strong stability.

Figure 20:
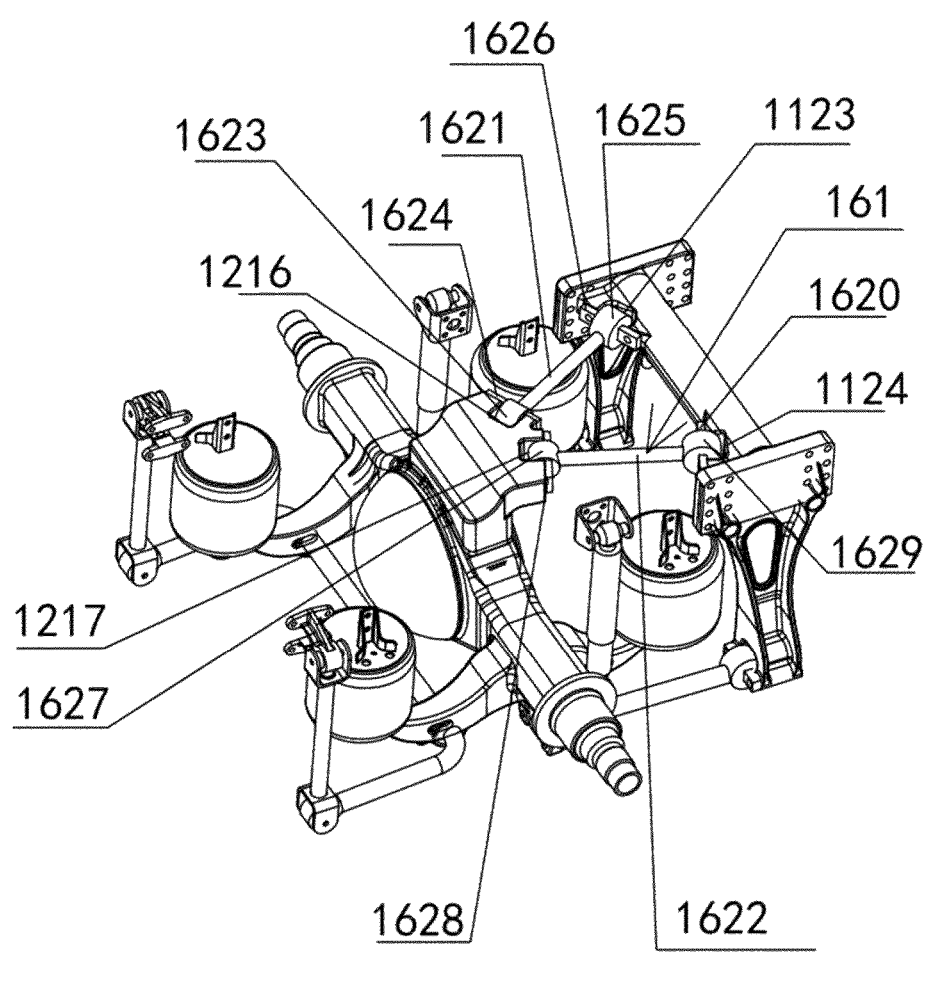
FIG. 20 is a schematic diagram of the structure of an air suspension system of a second thrust module provided in an embodiment of the present application.

Please refer to FIG. 20. Further, in a preferred embodiment provided in the present application, the first thrust module 161 includes a third side rod 1621 and a fourth side rod 1622;

the third side rod 1621 is provided with a third central rotating sleeve 1623 and a third central mounting shaft 1624 passing through the third central rotating sleeve 1623 and pivoting relative to the third central rotating sleeve 1623 at one end, and a third side rotating sleeve 1625 and a third side mounting shaft 1626 passing through the third side rotating sleeve 1625 and pivoting relative to the third side rotating sleeve 1625 at the other end;

the fourth side rod 1622 is provided with a fourth central rotating sleeve 1627 and a fourth central mounting shaft 1628 passing through the fourth central rotating sleeve 1627 and pivoting relative to the fourth central rotating sleeve 1627 at one end, and a fourth side rotating sleeve 1629 and a fourth side mounting shaft 1620 passing through the fourth side rotating sleeve 1629 and pivoting relative to the fourth side rotating sleeve 1629 at the other end;

the bridge housing body 1211 is respectively provided with a third central mounting seat 1216 matched with the third central mounting shaft 1624 and a fourth central mounting seat 1217 matched with the fourth central mounting shaft 1628;

the frame crossbeam 112 is respectively provided with a third side mounting seat 1123 matched with the third side mounting shaft 1626 and a fourth side mounting seat 1124 matched with the fourth side mounting shaft 1620;

the third central mounting shaft 1624 is matched with the third central mounting seat 1216;

the fourth central mounting shaft 1628 is matched with the fourth central mounting seat 1217;

the third side mounting shaft 1626 is matched with the third side mounting seat 1123;

the fourth side mounting shaft 1620 is matched with the fourth side mounting seat 1124;

the third side rod 1621 and the fourth side rod 1622 are installed at a preset angle.

The first thrust module 161 includes a third side rod 1621 and a fourth side rod 1622.

A third central rotating sleeve 1623 and a third central mounting shaft 1624 passing through the third central rotating sleeve 1623 and pivoting relative to the third central rotating sleeve 1623 are provided at one end of the third side rod 1621. The third central rotating sleeve 1623 is sleeve-shaped. The third central mounting shaft 1624 is inserted into the third central rotating sleeve 1623 and can be fixed relative to the bridge housing body 1211. A third side rotating sleeve 1625 and a third side mounting shaft 1626 passing through the third side rotating sleeve 1625 and pivoting relative to the third side rotating sleeve 1625 are provided at the other end of the third side rod 1621. The third side rotating sleeve 1625 is sleeve-shaped. The third side mounting shaft 1626 is inserted into the third side rotating sleeve 1625 and can be fixed relative to the frame crossbeam 112.

A fourth central rotating sleeve 1627 and a fourth central mounting shaft 1628 passing through the fourth central rotating sleeve 1627 and pivoting relative to the fourth central rotating sleeve 1627 are provided at one end of the fourth side rod 1622. The fourth central rotating sleeve 1627 is sleeve-shaped. The fourth central mounting shaft 1628 is inserted into the fourth central rotating sleeve 1627 and can be fixed relative to the bridge housing body 1211. The other end of the fourth side rod 1622 is provided with a fourth side rotating sleeve 1629 and a fourth side mounting shaft 1620 passing through the fourth side rotating sleeve 1629 and pivoting relative to the fourth side rotating sleeve 1629. The fourth side rotating sleeve 1629 is sleeve-shaped. The fourth side mounting shaft 1620 is inserted into the fourth side rotating sleeve 1629 and can be fixed relative to the frame crossbeam 112.

The third side rod 1621 and the fourth side rod 1622 are at a preset angle. The preset angle is an acute angle.

The bridge housing body 1211 is respectively provided with a third central mounting seat 1216 matched with the third central mounting shaft 1624 and a fourth central mounting seat 1217 matched with the fourth central mounting shaft 1628. The third central mounting shaft 1624 is matched with the third central mounting seat 1216. The fourth central mounting shaft 1628 is matched with the fourth central mounting seat 1217.

The frame crossbeam 112 is respectively provided with a third side mounting seat 1123 matched with the third side mounting shaft 1626 and a fourth side mounting seat 1124 matched with the fourth side mounting shaft 1620. The third side mounting shaft 1626 is matched with the third side mounting seat 1123. The fourth side mounting shaft 1620 is matched with the fourth side mounting seat 1124.

The third side rod 1621 and the fourth side rod 1622 of the first thrust module 161 are at a preset angle. The first thrust module 161, the frame crossbeam 112, and the bridge housing body 1211 are arranged in a trapezoidal shape. Since the quadrilateral is easy to move within a certain range, the air suspension system 100 composed of the frame 11, the bridge housing 12, and the air springs 13, the shock absorbers 14, and the thrust module 16 connected between the frame 11 and the bridge housing 12 can move relatively within a certain range and is not easily damaged.

Figure 21:
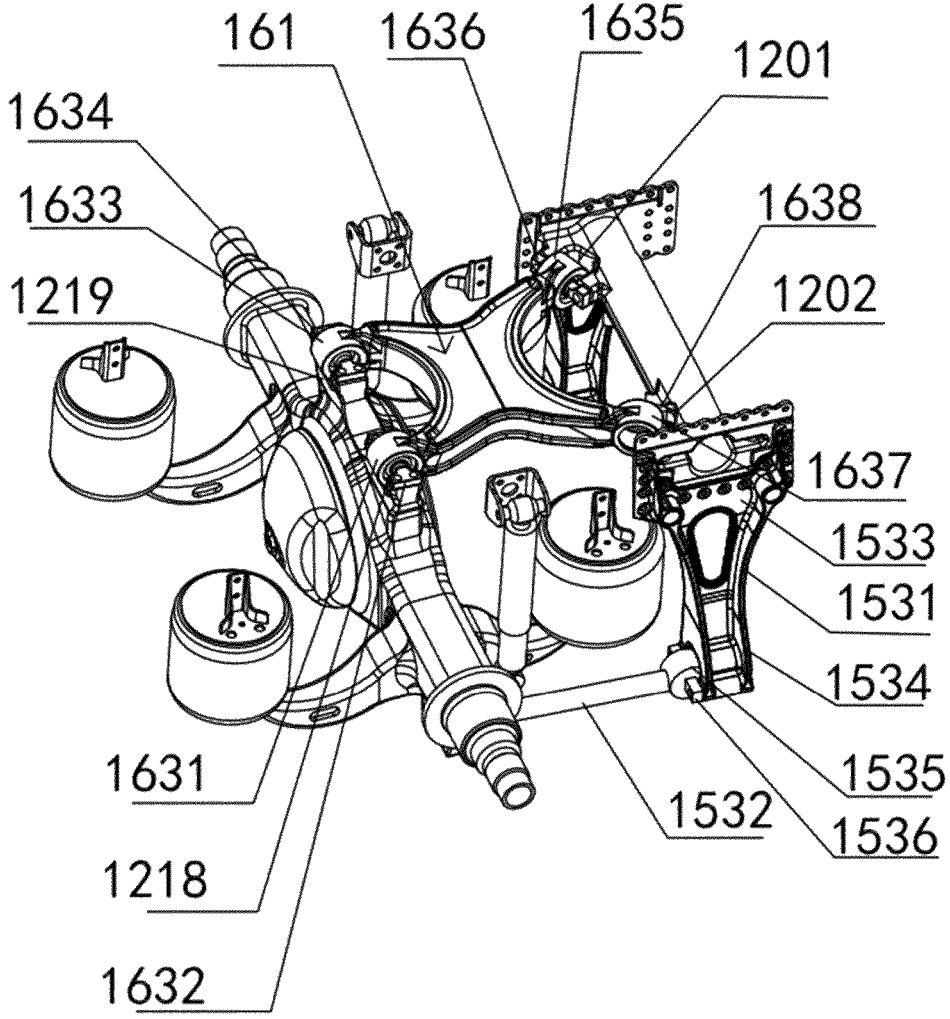
FIG. 21 is a schematic diagram of the structure of an air suspension system of a third thrust module provided in an embodiment of the present application.

Please refer to FIG. 21. Further, in a preferred embodiment provided in the present application, the first thrust module 161 includes a plate-like member;

the plate-like member includes a middle portion and four corner portions extending from the middle portion in four directions respectively, the four corner portions gradually narrow from the center to the corners, and two adjacent corner portions are connected by an arc transition;

the ends of the four corner portions are respectively provided with a fifth rotating sleeve 1631 and a fifth mounting shaft 1632 passing through the fifth rotating sleeve 1631 and pivoting relative to the fifth rotating sleeve 1631, a sixth rotating sleeve 1633 and a sixth mounting shaft 1634 passing through the sixth rotating sleeve 1633 and pivoting relative to the sixth rotating sleeve 1633, a seventh rotating sleeve 1635 and a seventh mounting shaft 1636 passing through the seventh rotating sleeve 1635 and pivoting relative to the seventh rotating sleeve 1635, and an eighth rotating sleeve 1637 and the eighth mounting shaft 1638 passing through the eighth rotating sleeve 1637 and pivoting relative to the eighth rotating sleeve 1637;

the bridge housing body 1211 is respectively provided with a fifth mounting seat 1218 matched with the fifth mounting shaft 1632 and a sixth mounting seat 1219 matched with the sixth mounting shaft 1634;

the frame crossbeam 112 is respectively provided with a seventh mounting seat 1201 matched with the seventh mounting shaft 1636 and an eighth mounting seat 1202 matched with the eighth mounting shaft 1638;

the fifth mounting shaft 1632 is matched with the fifth mounting seat 1218;

the sixth mounting shaft 1634 is matched with the sixth mounting seat 1219;

the seventh mounting shaft 1636 is matched with the seventh mounting seat 1201;

the eighth mounting shaft 1638 is matched with the eighth mounting seat 1202.

The first thrust module 161 includes a plate-like member. The plate-like member includes a middle portion and four corner portions extending from the middle portion in four directions. The four corner portions gradually narrow from the center to the edge corners. Two adjacent corner portions are connected by an arc transition.

The ends of the four corners are respectively provided with a fifth rotating sleeve 1631 and a fifth mounting shaft 1632 passing through the fifth rotating sleeve 1631 and pivoting relative to the fifth rotating sleeve 1631, a sixth rotating sleeve 1633 and a sixth mounting shaft 1634 passing through the sixth rotating sleeve 1633 and pivoting relative to the sixth rotating sleeve 1633, a seventh rotating sleeve 1635 and a seventh mounting shaft 1636 passing through the seventh rotating sleeve 1635 and pivoting relative to the seventh rotating sleeve 1635, and an eighth rotating sleeve 1637 and an eighth mounting shaft 1638 passing through the eighth rotating sleeve 1637 and pivoting relative to the eighth rotating sleeve 1637. The fifth rotating sleeve 1631 is sleeve-shaped. The sixth rotating sleeve 1633 is sleeve-shaped. The seventh rotating sleeve 1635 is sleeve-shaped. The eighth rotating sleeve 1637 is sleeve-shaped. The fifth mounting shaft 1632 is inserted into the fifth rotating sleeve 1631 and can be fixed relative to the bridge housing body 1211. The sixth mounting shaft 1634 is inserted into the sixth rotating sleeve 1633 and can be fixed relative to the bridge housing body 1211. The seventh mounting shaft 1636 is inserted into the seventh rotating sleeve 1635 and can be fixed relative to the frame crossbeam 112. The eighth mounting shaft 1638 is inserted into the eighth rotating sleeve 1637 and can be fixed relative to the frame crossbeam 112.

The bridge housing body 1211 is respectively provided with a fifth mounting seat 1218 matched with the fifth mounting shaft 1632 and a sixth mounting seat 1219 matched with the sixth mounting shaft 1634. The fifth mounting shaft 1632 is matched with the fifth mounting seat 1218. The sixth mounting shaft 1634 is matched with the sixth mounting seat 1219.

The frame crossbeam 112 is respectively provided with a seventh mounting seat 1201 matched with the seventh mounting shaft 1636 and an eighth mounting seat 1202 matched with the eighth mounting shaft 1638. The seventh mounting shaft 1636 is matched with the seventh mounting seat 1201. The eighth mounting shaft 1638 is matched with the eighth mounting seat 1202.

The first thrust module 161 is an integral plate-like member, and has four corners extending from the middle portion in four directions, so that the impact force between the frame 11 and the bridge housing 12 can be buffered from four directions. Therefore, the air suspension system 100 composed of the frame 11, the bridge housing 12, and the air springs 13, the shock absorbers 14 and the thrust module 16 connected between the frame 11 and the bridge housing 12 has strong stability.

Figure 24:
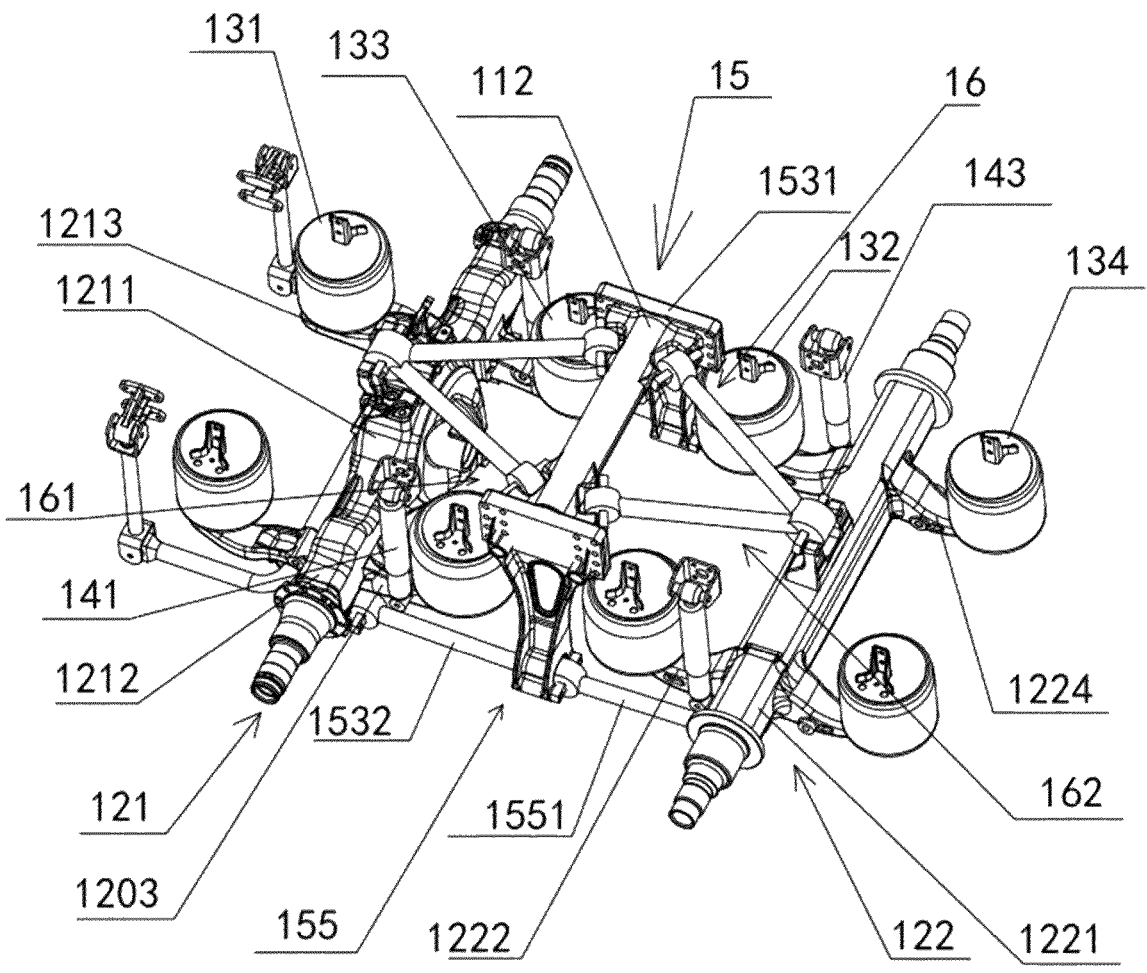
FIG. 24 is a schematic diagram of the structure of another air suspension system with a drive axle housing and a trailer axle housing provided in an embodiment of the present application.

Please refer to FIG. 24. Furthermore, in a preferred embodiment provided in the present application, the plate-like member is provided with reinforcing ribs protruding along the thickness direction at the contour edge.

The plate-like member is provided with reinforcing ribs protruding along the thickness direction at the contour edge, thereby improving the strength of the plate-like member.

Figure 22:
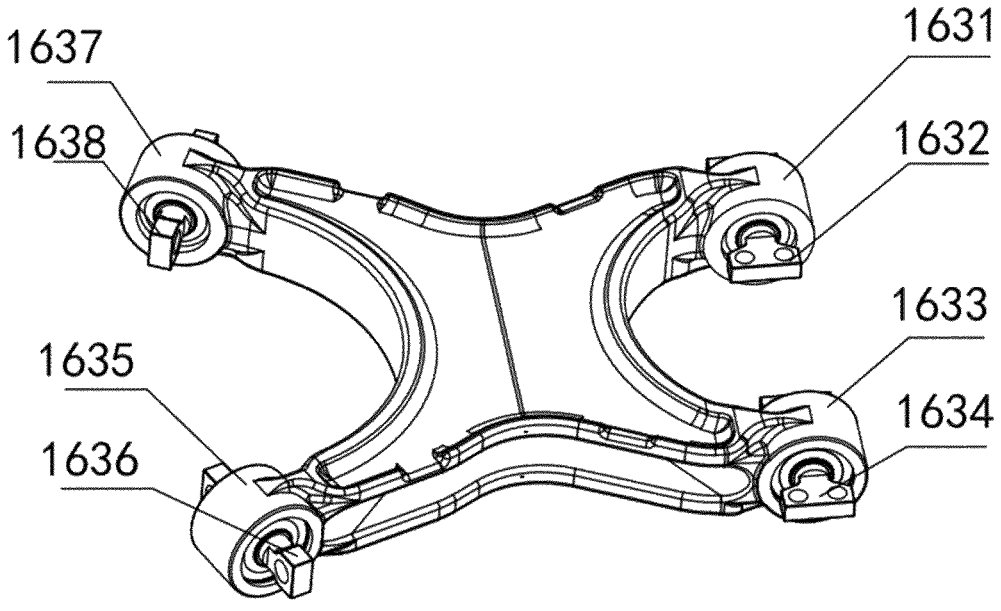
FIG. 22 is a schematic diagram of the structure of the thrust module in FIG. 21.

Please refer to FIG. 22. Further, in a preferred embodiment provided in the present application, the reinforcing ribs are continuously distributed or have openings at preset positions.

For the convenience of casting, the reinforcing ribs of the plate-like member can be continuously distributed.

Of course, in order to alleviate the stress concentration of the cast plate-like member, the reinforcing ribs of the plate-like member can have openings at preset positions.

Please refer to FIGS. 19 to 21. Further, in a preferred embodiment provided by the present application, at least one of the first central mounting shaft 1612, the first side mounting shaft 1616 or the second side mounting shaft 1618 is set in sections, including a cylindrical section and a plate-like section located on both sides of the cylindrical section; or at least one of the third central mounting shaft 1624, the fourth central mounting shaft 1628, the third side mounting shaft 1626 or the fourth side mounting shaft 1620 is set in sections, including a cylindrical section and a plate-like section located on both sides of the cylindrical section; or at least one of the fifth mounting shaft 1632, the sixth mounting shaft 1634, the seventh mounting shaft 1636 or the eighth mounting shaft 1638 is set in sections, including a cylindrical section and a plate-like section located on both sides of the cylindrical section.

The cylindrical section of the segmented installation shaft is easy to pivot, while the plate-shaped section is easy to install and fix. In one embodiment provided in the present application, the installation shaft can be composed of a sleeve, a cylindrical rubber ring embedded in the sleeve, and a rod-shaped member inserted into the rubber ring from the outside to the inside. The length of the rod-shaped member is greater than the depth of the sleeve and the rubber ring, thereby forming a configuration with a cylindrical section in the center and plate-shaped sections on both sides.

Please refer to FIG. 21 again. Further, in a preferred embodiment provided in the present application, the first frame arm 1531 includes a wing plate 1533 fixedly fitted with the frame longitudinal beam 111 and a three-dimensional sleeve 1534 extending from the thickness direction of the wing plate 1533 and gradually increasing in thickness;

the end of the first rotating arm 1532 is provided with an arm sleeve 1535 and an arm sleeve shaft 1536 passing through the arm sleeve 1535;

the arm sleeve shaft 1536 is matched with the three-dimensional sleeve 1534 so that the first rotating arm 1532 can pivot relative to the first frame arm 1531.

The first frame arm 1531 includes a wing plate 1533 that is flatly fixed to the frame longitudinal beam 111 and a three-dimensional sleeve 1534 that extends from the thickness direction of the wing plate 1533 and gradually increases in thickness.

The wing plate 1533 can be understood as a plate-like member that extends in the vertical direction and the longitudinal extension of the frame longitudinal beam 111. The wing plate 1533 fits the outer surface of the frame longitudinal beam 111 in the vertical direction. The wing plate 1533 and the frame longitudinal beam 111 can be matched by bolts. The wing plate 1533 has two side wing edges that are perpendicular to the frame longitudinal beam 111. The wing edges extend from the thickness direction of the wing plate 1533, and the extension thickness gradually increases to form a three-dimensional sleeve 1534.

An arm sleeve 1535 and an arm sleeve shaft 1536 that passes through the arm sleeve 1535 are provided at the end of the first rotating arm 1532. The arm sleeve shaft 1536 is matched with the three-dimensional sleeve 1534. The first rotating arm 1532 can pivot around the arm sleeve shaft 1536. The main body of the first frame arm 1531 is a frame-shaped hollow structure, which is light in weight but can maintain considerable strength.

Please refer to FIG. 19. Further, in a preferred embodiment provided in the present application, the connecting rod frame 15 also includes a fourth connecting rod frame 154;

the fourth connecting rod frame 154 is connected to the frame longitudinal beam 111 at one end and to the first support arm 1213 at the other end.

In order to improve the adaptability to longitudinal loads and transverse loads, the connecting rod frame 15 also includes a fourth connecting rod frame 154. The fourth connecting rod frame 154 is connected to the frame longitudinal beam 111 at one end and to first support arm 1213 at the other end.

Please refer to FIG. 19. Further, in a preferred embodiment provided in the present application, the fourth connecting rod frame 154 includes a first arm 1541, a second arm 1542 and a rod shaft 1545;

the first arm 1541 is provided with a cylindrical arm support 1543;

the second arm 1542 is provided with a three-sided frame support 1544;

the three-sided frame support 1544 accommodates the cylindrical arm support 1543 therein;

the rod shaft 1545 passes through the cylindrical arm support 1543 and is connected to the three-sided frame support 1544.

The fourth connecting rod frame 154 includes a first arm 1541, a second arm 1542 and a lever shaft 1545. The first arm 1541 is a rod-shaped member, and a cylindrical arm support 1543 is provided at one end away from the first support arm 1213. The second arm 1542 is a rod-shaped member, and a three-sided frame support 1544 is provided at one end away from the frame longitudinal beam 111. The three-sided frame support 1544 accommodates the cylindrical arm support 1543 therein. The rod shaft 1545 passes through the cylindrical arm support 1543 and is connected to the three-sided frame support 1544. The fourth connecting rod frame 154 has a simple structure and low implementation cost.

Please refer to FIG. 19. Further, in a preferred embodiment provided in the present application, the first support arms 1213 are arranged in pairs;

the first support arms 1213 arranged in pairs are distributed on the same side of the half-axle sleeves 1212 and are symmetrically distributed;

the air suspension system 100 also includes a transverse connecting beam 123 that transversely connects the paired first support arms 1213.

The first support arms 1213 are arranged in pairs. The first support arms 1213 arranged in pairs are distributed on the same side of the half-axle sleeves 1212 and are symmetrically distributed, so as to facilitate balancing the load of the frame 11. In order to further increase the lateral load of the air suspension system 100, that is, to meet the lateral stiffness when the vehicle turns or tilts, the air suspension system 100 also includes a transverse connecting beam 123 that lateral connects the paired first support arms 1213.

Figure 23:
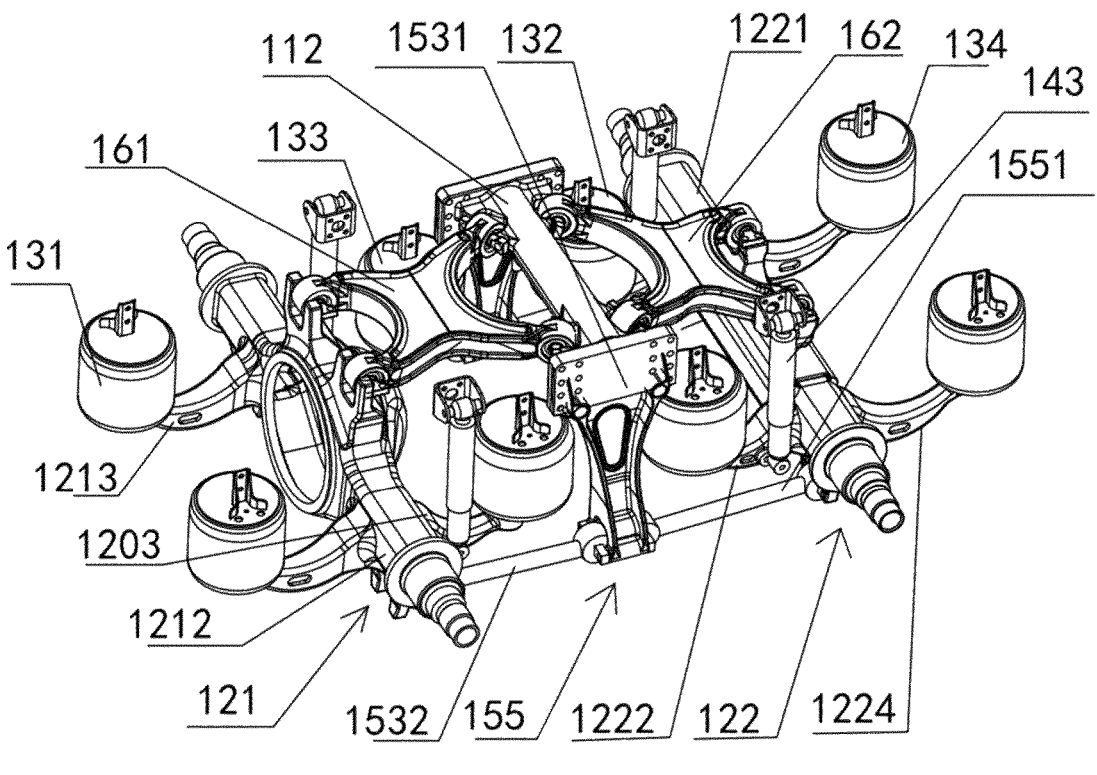
FIG. 23 is a schematic diagram of the structure of another air suspension system with a drive axle housing and a trailer axle housing provided in an embodiment of the present application.

Please refer to FIGS. 23 and 24. Further, in a preferred embodiment provided in the present application, the bridge housing 12 also includes a trailer axle housing 122;

the trailer axle housing 122 includes an axle shaft 1221, a second support arm 1222 extending from the axle shaft 1221 along the periphery of the axle shaft 1221 toward a first direction, and a fourth support arm 1224 extending from the axle shaft 1221 along the periphery of the axle shaft 1221 toward a second direction away from the first direction;

the connecting rod frame 15 also includes a fifth connecting rod frame 155;

the fifth connecting rod frame 155 includes a first frame arm 1531, a first rotating arm 1532 pivotally connected to the first frame arm 1531, and a second rotating arm 1551 pivotally connected to the first frame arm 1531;

one end of the first frame arm 1531 is connected to the frame longitudinal beam 111, and the other end is pivotally connected to the first rotating arm 1532 and the second rotating arm 1551;

the first rotating arm 1531 is connected to the frame longitudinal beam 111 at one end, and the first rotating arm 1532 and the second rotating arm 1551 at the other end;

the other end of the first rotating arm 1532 is connected to the half-axle sleeves 1212;

the other end of the second rotating arm 1551 is connected to the axle shaft 1221;

the shock absorbers 14 also includes a third shock absorber 143;

one end of the third shock absorber 143 is connected to the frame longitudinal beam 111, and the other end is connected to the second support arm 1222;

the air springs 13 also include a second air spring 132 distributed in the second longitudinal position and a fourth air spring 134 distributed in the fourth longitudinal position;

one side of the second air spring 132 is installed on the second support arm 1222, and the other side is installed on the frame longitudinal beam 111;

one side of the fourth air spring 134 is installed on the fourth support arm 1224, and the other side is installed on the frame longitudinal beam 111;

the thrust module 16 includes a second thrust module 162;

one side of the second thrust module 162 is connected to the axle shaft 1221, and the other side is connected to the frame crossbeam 112.

The axle housing 12 also includes a trailer axle housing 122. The trailer axle housing 122 includes an axle shaft 1221, a second support arm 1222 extending from the axle shaft 1221 along the periphery of the axle shaft 1221 toward a first direction, and a fourth support arm 1224 extending from the axle shaft 1221 along the periphery of the axle shaft 1221 toward a second direction away from the first direction.

The axle shaft 1221 is used to install the driven wheel in the wheels. The axle shaft 1221 can be a solid or a hollow sleeve. Depending on the specific application scenario, the hollow sleeve-shaped axle shaft 1221 can be a cylinder, a square cylinder, or other shapes that are not completely closed in the circumferential direction.

The second support arm 1222 extending from the axle shaft 1221 along the periphery of the axle shaft 1221 toward the first direction, and the fourth support arm 1224 extending from the axle shaft 1221 along the periphery of the axle shaft 1221 toward the second direction away from the first direction.

The second support arm 1222 are arranged in pairs, and the paired second support arm 1222 are distributed on the same side of the axle shaft 1221 and are symmetrically distributed, so as to facilitate balancing the load of the frame 11. The second support arms 1222 can be used to carry the air springs 13. The fourth support arm 1224 are also arranged in pairs, and the paired fourth support arms 1224 are distributed on the same side of the axle shaft 1221 and are symmetrically distributed. The first direction in which the second support arm 1222 extend and the second direction in which the fourth support arm 1224 extend are substantially equivalent to the longitudinal direction of the frame longitudinal beam 111.

The connecting rod frame 15 also includes a fifth connecting rod frame 155. The fifth connecting rod frame 155 includes a first frame arm 1531, a first rotating arm 1532 pivotally connected to the first frame arm 1531, and a second rotating arm 1551 pivotally connected to the first frame arm 1531. One end of the first frame arm 1531 is connected to the frame longitudinal beam 111, and the other end is pivotally connected to the first rotating arm 1532 and the second rotating arm 1551. The other end of the first rotating arm 1532 is connected to the half-axle sleeve 1212. The other end of the second rotating arm 1551 is connected to the axle shaft 1221.

The fifth connecting rod frame 155 supports the frame longitudinal beam 111 in the vertical direction. The longitudinal load borne by the longitudinal direction of the frame longitudinal beam 111 is transmitted from the first frame arm 1531 to the first rotating arm 1532 and the second rotating arm 1551, and finally transmitted to the half-axle sleeve 1212 and the axle shaft 1221.

The shock absorbers 14 include a third shock absorber 143. One end of the third shock absorber 143 is connected to the frame longitudinal beam 111, and the other end is connected to the second support arm 1222. Thus, the shock absorbers 14 can buffer the relative movement between the frame longitudinal beam 111 and the bridge housing 12.

The air springs 13 also include a second air spring 132 distributed at a second longitudinal position and a fourth air spring 134 distributed at a fourth longitudinal position. One side of the second air spring 132 is mounted on the second support arm 1222, and the other side is mounted on the frame longitudinal beam 111. The fourth air spring 134 is mounted on one side of the fourth support arm 1224, and the other side is mounted on the frame longitudinal beam 111.

The thrust module 16 includes a second thrust module 162. One side of the second thrust module 162 is connected to the axle shaft 1221, and the other side is connected to the frame crossbeam 112.

In this embodiment, an air suspension system 100 having a drive axle housing 121 and a trailer axle housing 122 is provided, which expands the scope of application.

Further, in a preferred embodiment provided in the present application, there are two drive bridge housing 121.

In this embodiment, a technical solution with two drive bridge housing 121 is provided, thereby expanding the application scope of the air suspension system 100.

Further, in a preferred embodiment provided in the present application, the drive axle housing 121 is used for an electric drive vehicle.

In this embodiment, a technical solution for using the drive bridge housing 121 for an electric drive vehicle is provided, thereby expanding the application scope of the air suspension system 100.

The present application provides an air suspension system with an integrally cast bridge housing and an X-type thrust rod. The air suspension system includes a vehicle cross beam, a vehicle longitudinal beam, a fixed bracket, an integrally cast bridge housing, an X-type thrust rod, an air spring, a shock absorber and an I-type thrust rod. The vehicle longitudinal beams are in two groups and are arranged horizontally and parallel. The vehicle cross beam is fixedly connected between the two groups of vehicle longitudinal beams. The top of the fixed bracket is fixedly connected to the outer wall of the vehicle longitudinal beam. The integrally cast bridge housing is connected to the fixed bracket through an I-type thrust rod. The I-type thrust rod is located below the vehicle longitudinal beam. The fixed bracket is fixedly connected to the vehicle longitudinal beam. The X-type thrust rod is arranged between the integrally cast bridge housing and the vehicle cross beam.

The air spring and shock absorber are connected between the vehicle longitudinal beam and the integrally cast bridge shell respectively, and are used to adjust the frame height and reduce bumps and impacts.

The above structures together form a parallelogram suspension system. The parallelogram structure can reduce the inclination change of the suspension rod system jumping up and down during operation, and ensure a reasonable power line angle of the transmission shaft.

In addition, under a pair of vehicle longitudinal beams, a pair of air spring support arms extend from the axis of the integrally cast bridge shell to both sides of the longitudinal direction of the vehicle. An air spring can be installed on each air spring support arm. The other side of each air spring is connected to the lower end face of the vehicle longitudinal beam, thereby realizing the elastic connection between the frame and the axle. The air spring support arm is connected to the lower end of a shock absorber, and the upper end of the shock absorber is connected to the vehicle longitudinal beam.

The air spring support arm plays a role in guiding the vehicle, while connecting the air spring and the bridge housing body in the suspension system, so that the bridge housing body is elastically connected to the vehicle longitudinal beam, which can alleviate the impact load on the frame due to uneven road surface during vehicle driving, reduce the vibration caused by it, improve driving comfort and reduce the vibration impact of the cargo. Overall, the fixed bracket, I-type thrust rod, one-piece cast bridge housing and X-type thrust rod together form a parallelogram suspension system.

In the structure of this suspension system, the X-type thrust rod is connected between the vehicle crossbeam and the one-piece cast bridge housing. Compared with the suspension system of the V-type rod and the lateral stabilizer bar, the suspension system of the X-type thrust rod has a guiding function, and also has the lateral anti-rolling function of the vehicle, with the advantages of high integration and lightweight. At the same time, because the X-type thrust rod has both guiding and anti-rolling functions, the force structure is more complex and the load is increased.

The air spring support arm and the bridge housing body are an integrated structure, and the cross section between the air spring support arm and the bridge housing body is any one of a square shape, a door shape, an I shape or a T shape.

The present application provides an air suspension system with an integral cast bridge housing and a V-shaped thrust rod, including: a frame longitudinal beam, a bridge housing body, an air spring, a V-shaped thrust rod, a shock absorber, a stabilizer bar, and a lateral balance link.

The present application also provides an air suspension system with an integral cast bridge housing and a trapezoidal thrust rod, including: a frame longitudinal beam, a bridge housing body, an air spring, a thrust rod assembly, a shock absorber, a stabilizer bar, a transverse balance link and a lower thrust rod.

In the above two embodiments, the transverse balance link is cast in one piece.

Among them: the transverse balance link includes: a balance rod and a thrust rod support.

The middle balance rod of the transverse balance link adopts a hollow circular cross-section, or a hollow elliptical, mouth-shaped, or trapezoidal cross-section.

The two ends of the balance rod are connected to the thrust rod support, and the thrust rod support is symmetrically distributed on both sides of the balance rod. A rectangular mounting boss is provided at the connection between the thrust rod support and the balance rod, which can also be a trapezoidal, square, or polygonal structure.

In the above two embodiments, the bridge housing body can also be an integral dual-motor electric drive vehicle bridge housing.

It is noted that the terms "including", "comprising", or any other variant thereof, are intended to cover non-exclusive inclusion such that a process, method, commodity, or apparatus comprising a set of elements includes not only those elements, but also other elements not expressly listed, or also other elements not expressly listed. or which are inherent to such process, method, commodity or equipment. Without further limitation, the fact that an element is defined by the phrase "including a . . . " does not preclude the existence of another element of the same kind in the process, method, commodity, or apparatus including the said element.

The foregoing is only an example of the present application and is not intended to limit the present application. The present application is subject to various changes and variations for those skilled in the art. Any modifications, equivalent substitutions, improvements, etc. made within the spirit and principles of this application shall be included in the scope of the claims of this application.

What is claimed is:

1. An air suspension system, comprising a frame for mounting a vehicle body, a bridge housing for mounting wheels, and air springs, shock absorbers, a connecting rod frame and a thrust module connected between the frame and the bridge housing, characterized in that:

the frame comprising a frame longitudinal beam;

the bridge housing comprising a drive bridge housing;

the drive bridge housing comprising a bridge housing body, half-axle sleeves located on both sides of the bridge housing body, and a first support arm extending from the half-axle sleeve along the periphery of the half-axle sleeve in a first direction and a first longitudinal push arm extending from the half-axle sleeve along the periphery of the half-axle in a second direction away from the first direction;

the connecting rod frame comprising a first connecting rod frame;

one end of the first connecting rod frame being connected to the frame longitudinal beam; and the other end being pivotally connected to the first longitudinal push arm;

the shock absorbers including a first shock absorber;

one end of the first shock absorber being connected to the frame longitudinal beam, and the other end being connected to the first longitudinal push arm;

the air spring including a first air spring distributed in the first longitudinal position;

one side of the first air spring being installed on the first support arm, and the other side being installed on the frame longitudinal beam;

the thrust module including a first thrust module;

one side of the first thrust module being connected to the bridge housing body, and the other side being horizontally and vertically connected to the frame longitudinal beam;

the bridge housing is integrally cast and includes a circumferentially extending brake base plate;

the brake base plate is used to install the brake shoe of a drum brake or to install the brake caliper bracket of a disc brake.

2. The air suspension system according to claim 1, characterized in that the bridge housing body of the drive bridge housing and the half-axle sleeve are integrally cast or separately cast and then welded into one.

3. The air suspension system according to claim 1, characterized in that a cross-section of a main part of an extension of the first support arm is one of the following structures:

a groove surrounded by three sides;

a groove surrounded by three sides and having an intermediate wall extending at the bottom of the groove parallel to the groove wall;

T-shaped;

a ring-shaped groove surrounded by four sides;

H-shaped.

4. The air suspension system according to claim 1 is characterized in that the half-axle sleeve is in a one-piece shape or has two sections.

5. The air suspension system according to claim 1, characterized in that the first support arms are arranged in pairs;

the first support arms arranged in pairs are distributed on the same side of the half-axle sleeves and are symmetrically distributed;

the air suspension system also includes a transverse connecting beam that transversely connects the paired first support arms.

6. The air suspension system according to claim 1, characterized in that the bridge housing also includes a trailer axle housing;

the trailer axle housing includes an axle shaft, a second support arm extending from the axle shaft along the periphery of the axle shaft toward a first direction, and a second longitudinal push arm extending from the axle shaft along the periphery of the axle shaft toward a second direction away from the first direction;

the connecting rod frame also includes a second connecting rod frame;

one end of the second connecting rod frame is connected to the frame longitudinal beam, and the other end is pivotally connected to the second longitudinal push arm;

the shock absorbers include a second shock absorber;

one end of the second shock absorber is connected to the frame longitudinal beam, and the other end is connected to the second longitudinal push arm;

the air springs also include a second air spring distributed in the second longitudinal position;

one side of the second air spring is installed on the second support arm, and the other side is installed on the frame longitudinal beam;

the thrust module includes a second thrust module;

one side of the second thrust module is connected to the axle shaft, and the other side is horizontally and vertically connected to the frame longitudinal beam.

7. The air suspension system according to claim 1, characterized in that the first connecting rod frame extends a fork-shaped arm from the frame longitudinal beam;

the first longitudinal push arm is provided with a cylindrical arm support at the end;

the first connecting rod frame also includes an arm shaft;

the cylindrical arm support is embedded in the fork-shaped arm, and the arm shaft passes through the cylindrical arm support and is fixedly connected to the fork-shaped arm.

8. The air suspension system according to claim 7, characterized in that the arm shaft includes a cylindrical section and plate-shaped sections located on both sides of the cylindrical section.

9. The air suspension system according to claim 1, characterized in that there are two drive bridge housings.

10. The air suspension system according to claim 1, characterized in that the drive bridge housing is used for an electrically driven vehicle.

11. An air suspension system, comprising a frame for mounting a vehicle body, a bridge housing for mounting wheels, and air springs, shock absorbers, a connecting rod frame and a thrust module connected between the frame and the bridge housing, characterized in that:

the frame comprising a frame longitudinal beam;

the bridge housing comprising a drive bridge housing;

the drive bridge housing comprising a bridge housing body, half-axle sleeves located on both sides of the bridge housing body, and a first support arm extending from the half-axle sleeve along the periphery of the half-axle sleeve in a first direction and a first longitudinal push arm extending from the half-axle sleeve along the periphery of the half-axle in a second direction away from the first direction;

the connecting rod frame comprising a first connecting rod frame;

one end of the first connecting rod frame being connected to the frame longitudinal beam; and the other end being pivotally connected to the first longitudinal push arm;

the shock absorbers including a first shock absorber;

one end of the first shock absorber being connected to the frame longitudinal beam, and the other end being connected to the first longitudinal push arm;

the air spring including a first air spring distributed in the first longitudinal position;

one side of the first air spring being installed on the first support arm, and the other side being installed on the frame longitudinal beam;

the thrust module including a first thrust module;

one side of the first thrust module being connected to the bridge housing body, and the other side being horizontally and vertically connected to the frame longitudinal beam;

the first support arms are arranged in pairs;

the first support arms arranged in pairs are distributed on the same side of the half-axle sleeves and are symmetrically distributed;

the air suspension system also includes a transverse connecting beam that transversely connects the paired first support arms.

12. An air suspension system, comprising a frame for mounting a vehicle body, a bridge housing for mounting wheels, and air springs, shock absorbers, a connecting rod frame and a thrust module connected between the frame and the bridge housing, characterized in that:

the frame comprising a frame longitudinal beam;

the bridge housing comprising a drive bridge housing;

the drive bridge housing comprising a bridge housing body, half-axle sleeves located on both sides of the bridge housing body, and a first support arm extending from the half-axle sleeve along the periphery of the half-axle sleeve in a first direction and a first longitudinal push arm extending from the half-axle sleeve along the periphery of the half-axle in a second direction away from the first direction;

the connecting rod frame comprising a first connecting rod frame;

one end of the first connecting rod frame being connected to the frame longitudinal beam; and the other end being pivotally connected to the first longitudinal push arm;

the shock absorbers including a first shock absorber;

one end of the first shock absorber being connected to the frame longitudinal beam, and the other end being connected to the first longitudinal push arm;

the air spring including a first air spring distributed in the first longitudinal position;

one side of the first air spring being installed on the first support arm, and the other side being installed on the frame longitudinal beam;

the thrust module including a first thrust module;

one side of the first thrust module being connected to the bridge housing body, and the other side being horizontally and vertically connected to the frame longitudinal beam;

the first connecting rod frame extends a fork-shaped arm from the frame longitudinal beam;

the first longitudinal push arm is provided with a cylindrical arm support at the end;

the first connecting rod frame also includes an arm shaft;

the cylindrical arm support is embedded in the fork-shaped arm, and the arm shaft passes through the cylindrical arm support and is fixedly connected to the fork-shaped arm.

* * * * *